(12) United States Patent
Truscott et al.

(10) Patent No.: US 9,149,967 B2
(45) Date of Patent: Oct. 6, 2015

(54) EXTRUSION DIES WITH INTERNAL AND/OR EXTERNAL DECKLES

(71) Applicant: Nordson Extrusion Dies Industries LLC, Chippewa Falls, WI (US)

(72) Inventors: Michael K. Truscott, Chippewa Falls, WI (US); Dale P. Pitsch, Jim Falls, WI (US)

(73) Assignee: Nordson Corporation, Westlake, OH (US)

( * ) Notice: Subject to any disclaimer, the term of this patent is extended or adjusted under 35 U.S.C. 154(b) by 120 days.

(21) Appl. No.: 13/678,116

(22) Filed: Nov. 15, 2012

(65) Prior Publication Data

US 2013/0122131 A1    May 16, 2013

Related U.S. Application Data

(60) Provisional application No. 61/560,608, filed on Nov. 16, 2011.

(51) Int. Cl.
  *B29C 47/16* (2006.01)
  *B29C 47/08* (2006.01)
  (Continued)

(52) U.S. Cl.
  CPC ......... *B29C 47/0816* (2013.01); *B29C 47/0019* (2013.01); *B29C 47/0021* (2013.01); *B29C 47/0828* (2013.01); *B29C 47/0837* (2013.01); *B29C 47/16* (2013.01); *B29C 47/92* (2013.01); *B29C 2947/92628* (2013.01)

(58) Field of Classification Search
  CPC   B29C 47/16; B29C 47/0019; B29C 47/0021; B29C 47/0816; B29C 47/0828; B29C 47/0837; B29C 47/92; B29C 2947/92628

USPC .......................................... 425/141, 381, 466
See application file for complete search history.

(56) References Cited

U.S. PATENT DOCUMENTS

| | | | |
|---|---|---|---|
| 2,765,492 | A | 10/1956 | Velvel |
| 2,901,770 | A | 9/1959 | Beck |
| 2,998,624 | A | 9/1961 | Ricketts |

(Continued)

FOREIGN PATENT DOCUMENTS

| | | |
|---|---|---|
| CA | 2330159 A1 | 12/1999 |
| DE | 2608063 A1 | 9/1977 |

(Continued)

OTHER PUBLICATIONS

Engineering drawing of External Deckle used by Extrusion Dies Ind. LLC, Drawing No. 4DP37792.DEC, Apr. 12, 2007.

(Continued)

*Primary Examiner* — Yogendra Gupta
*Assistant Examiner* — Joseph Leyson
(74) *Attorney, Agent, or Firm* — Fredrikson & Byron, P.A.

(57) ABSTRACT

An extrusion die is provided with an external deckle assembly, an internal deckle assembly, or both. One embodiment provides an extrusion die having a wedge-actuated external deckle assembly. A seal member of the external deckle assembly moves to a sealed position in response to movement of the wedge in a first direction. Another embodiment provides an extrusion die with an internal deckle assembly having a deckle rod support system. The internal deckle assembly includes a deckle rod and a transversely elongated support engaged with the deckle rod to restrain the deckle rod against bending.

13 Claims, 19 Drawing Sheets

(51) Int. Cl.
  *B29C 47/00*   (2006.01)
  *B29C 47/92*   (2006.01)

(56) References Cited

U.S. PATENT DOCUMENTS

| | | |
|---|---|---|
| 3,018,515 A | 1/1962 | Sneddon |
| 3,039,143 A | 6/1962 | Nicholson |
| 3,067,464 A | 12/1962 | Nicholson |
| 3,238,563 A | 3/1966 | Hoffman |
| 3,293,689 A | 12/1966 | Chiselko et al. |
| 3,611,491 A | 10/1971 | Rector |
| 3,711,235 A | 1/1973 | Bunte et al. |
| 3,797,987 A | 3/1974 | Marion |
| 3,829,274 A | 8/1974 | Melead |
| 3,840,318 A | 10/1974 | Solop |
| 3,870,454 A | 3/1975 | Penrod |
| 4,008,036 A | 2/1977 | Verlinden et al. |
| 4,057,385 A | 11/1977 | Yazaki et al. |
| 4,248,579 A | 2/1981 | Maejima |
| 4,454,084 A | 6/1984 | Smith et al. |
| 4,659,302 A | 4/1987 | Maejima |
| 4,863,361 A | 9/1989 | Boos |
| 5,395,231 A | 3/1995 | Maejima |
| 5,451,357 A | 9/1995 | Cloeren |
| 5,456,869 A | 10/1995 | Miles et al. |
| 5,484,274 A | 1/1996 | Neu |
| 5,505,609 A | 4/1996 | Cloeren et al. |
| 5,511,962 A | 4/1996 | Lippert |
| 5,582,850 A | 12/1996 | Cloeren et al. |
| 5,679,387 A | 10/1997 | Cloeren et al. |
| 5,830,391 A | 11/1998 | Lamkemeyer et al. |
| 6,017,207 A | 1/2000 | Druschel |
| 6,106,268 A | 8/2000 | Figa et al. |
| 6,287,105 B1 | 9/2001 | Druschel et al. |
| 7,104,778 B2 | 9/2006 | Bomba |
| 2004/0056373 A1 | 3/2004 | Ulcej |
| 2008/0057148 A1 | 3/2008 | Pitch et al. |
| 2008/0163502 A1 * | 7/2008 | Siraky et al. .................. 33/1 PT |
| 2011/0206795 A1 | 8/2011 | Ulcej et al. |

FOREIGN PATENT DOCUMENTS

| | | |
|---|---|---|
| DE | 102011002313 | 4/2012 |
| DE | 102011002313 A1 | 4/2012 |
| JP | 54-097663 | 8/1979 |
| JP | 08142158 | 6/1996 |
| JP | 2002192594 | 7/2002 |
| WO | 99/61218 | 12/1999 |

OTHER PUBLICATIONS

English Machine Translation, DE 2608063, Sep. 15, 1977, 4 pages.
English abstract for German Publication No. DE 102011002313, published Apr. 12, 2012, 2 pages.
English-language abstract for JP08142158, Jun. 4, 1996.
English-language abstract for JP2002192594, Jul. 10, 2002.
International Search Report and Written Opinion, dated May 27, 2013 for PCT Application No. PCT/US2012/065400, 18 pages.

* cited by examiner

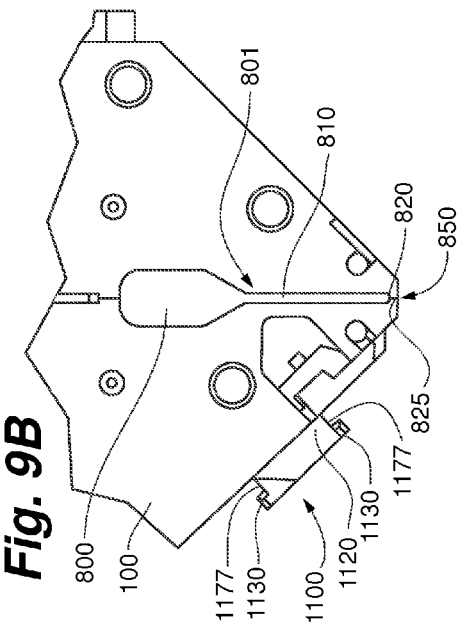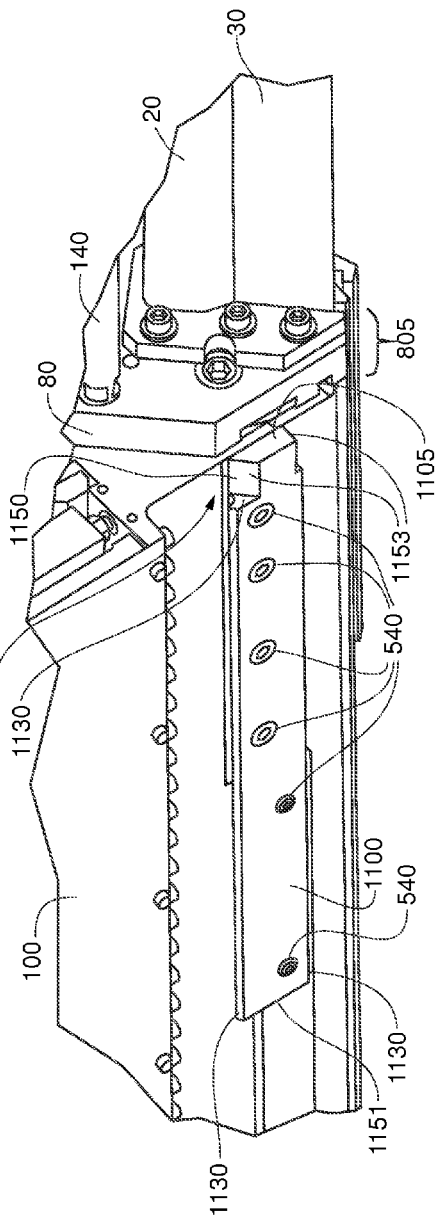

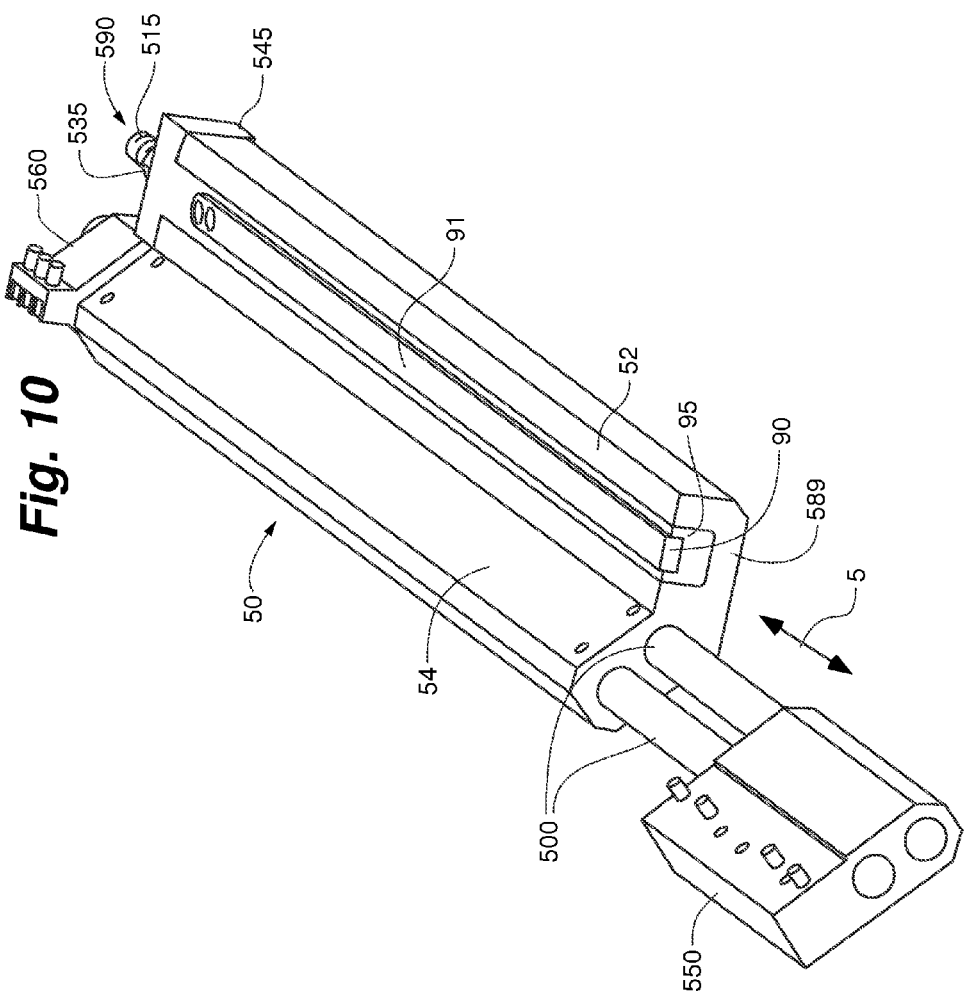

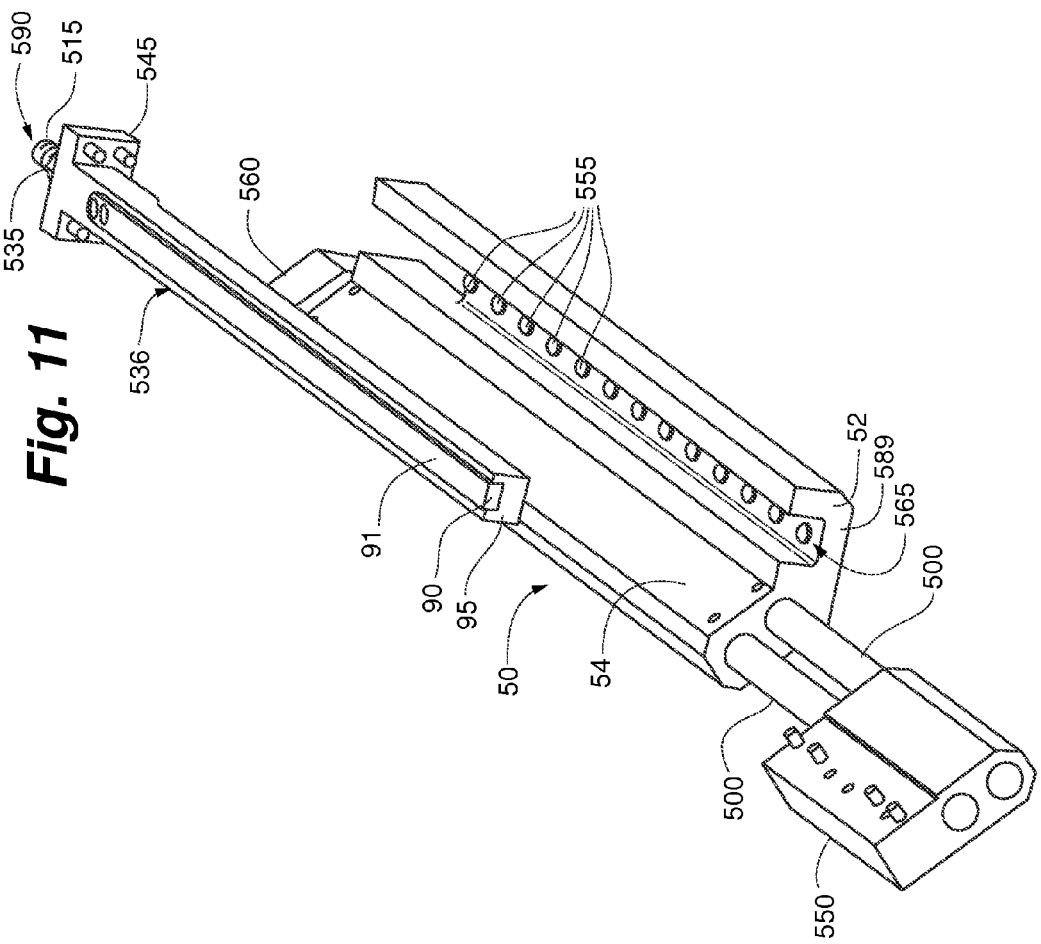

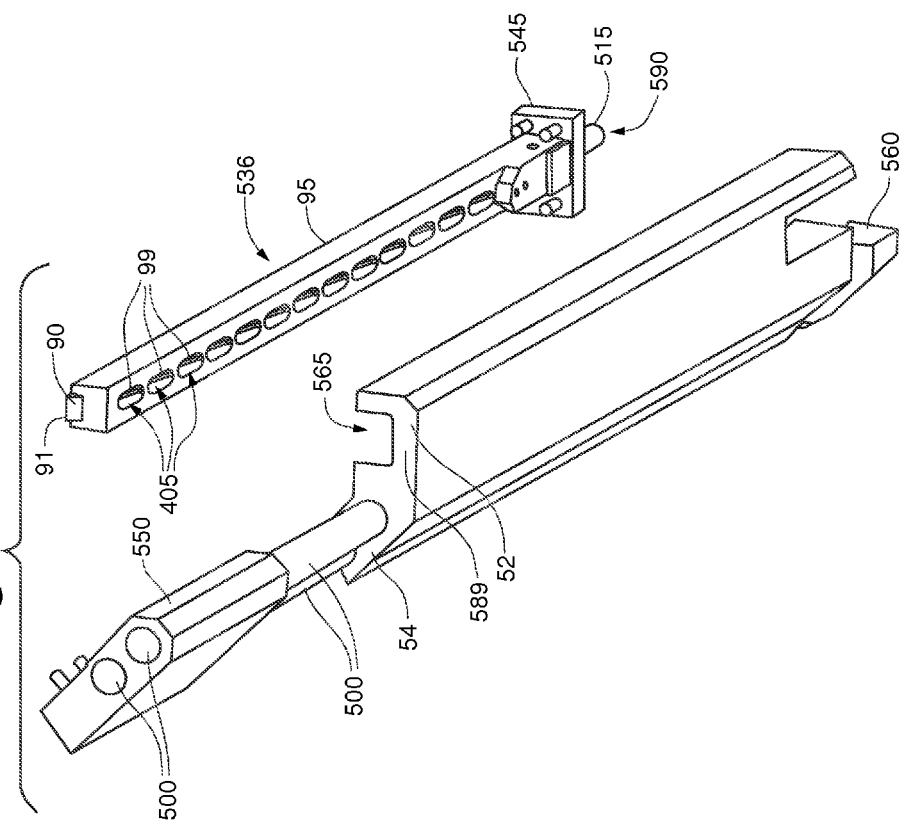

EXTRUSION DIES WITH INTERNAL AND/OR EXTERNAL DECKLES

CROSS-REFERENCE TO RELATED APPLICATION

The present application claims priority to U.S. Application No. 61/560,608, filed Nov. 16, 2011, the disclosure of which is incorporated herein by reference.

FIELD OF THE INVENTION

The present invention relates generally to extrusion dies having internal and/or external deckle systems.

BACKGROUND OF THE INVENTION

A variety of extrusion dies having internal or external deckle systems are known.

With respect to extrusion dies having external deckles, the assembly and disassembly of a conventional external deckle onto/from the conveyance system is difficult. In addition, the external deckle mechanism used to seal the orifice of the die is ineffective.

With respect to extrusion dies having internal deckles, it is common to use a deckle rod. Existing deckle systems, however, do not provide adequate support for the deckle rod. For example, when the transverse position of a deckle rod is adjusted on a conventional deckle system, the deckle rod may bend (or "flex") due to the lack of adequate support.

BRIEF DESCRIPTION OF THE DRAWINGS

FIG. 9A is a broken-away perspective view of an extrusion die in accordance with certain embodiments of the invention.

FIG. 9B is a cross-sectional view of the die of FIG. 9A.

FIG. 10 is a perspective view of an external deckle assembly in accordance with another embodiment of the invention.

FIG. 11 is a partially-exploded perspective view of the external deckle assembly of FIG. 10.

FIG. 12 is a partially-exploded perspective view of the external deckle assembly of FIG. 10, the external deckle assembly being shown from a different perspective than in FIG. 11.

SUMMARY OF THE INVENTION

Figure 1:
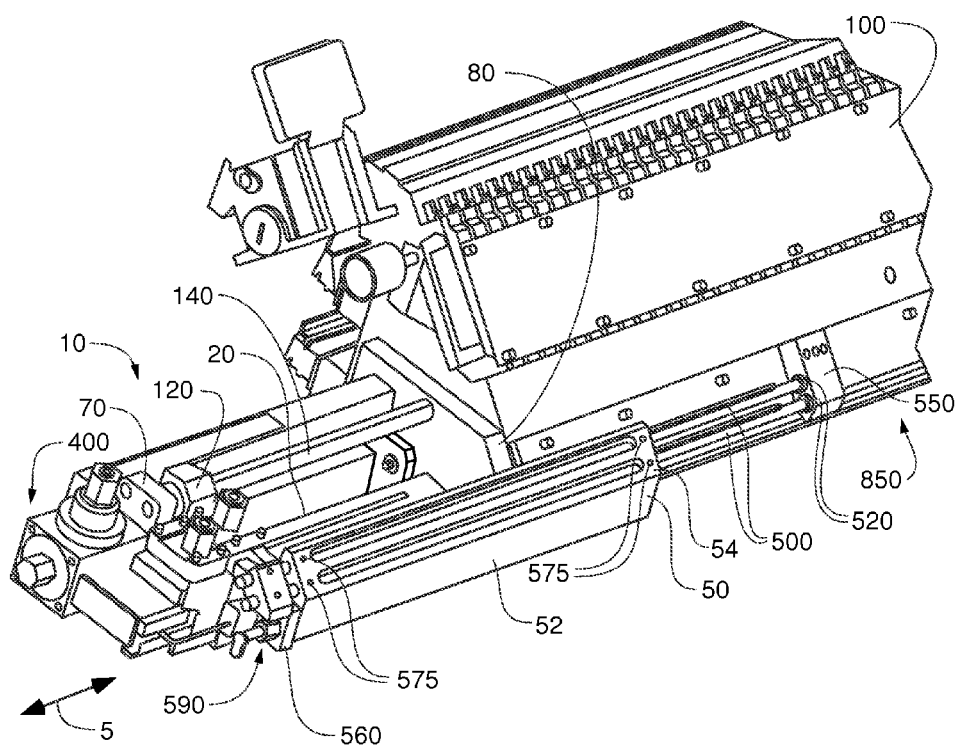
FIG. 1 is a partially broken-away perspective view of an extrusion die on which there is mounted an external deckle system in accordance with certain embodiments of the present invention.

In one embodiment, the invention provides an extrusion die having an internal flow passageway, an outlet orifice, and an external deckle assembly. The internal flow passageway leads to the outlet orifice. The external deckle assembly includes a deckle base, a seal member, a wedge, and a first fulcrum cam member. The seal member is moveable between an open position and a sealed position. The seal member when in the sealed position is held forcibly against the outlet orifice, and when in the open position is either spaced apart from the outlet orifice or held against the outlet orifice with less force than when in the sealed position. The wedge is movable in a first and second direction. The seal member moves to the sealed position in response to the movement of the wedge in the first direction. The seal member moves to the open position in response to the movement of the wedge in the second direction. The wedge rides on the first fulcrum cam member during movement of the wedge in the first and second directions.

Another embodiment of the invention provides an extrusion die having an internal flow passageway, an outlet orifice, and an internal deckle assembly. The internal flow passageway leads to the outlet orifice. The internal deckle assembly includes a deckle rod, a transversely elongated support, and a deckle carrier moveable transversely relative to the extrusion die. The transversely elongated support is engaged with the deckle rod to restrain the deckle rod against bending. The transversely elongated support is mounted such that when the deckle carrier moves transversely relative to the extrusion die, the transversely elongated support does not move transversely but rather is retained in a fixed transverse position.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the given examples have many useful alternatives, which fall within the scope of the invention.

The invention provides a number of advantageous technologies and features for extrusion dies having internal and/or external deckle assemblies. The following disclosure begins by describing the external deckle assembly itself, and then describes the external deckle assembly in combination with an extrusion die. FIGS. 1-4B show one embodiment of an extrusion die 100 with an external deckle assembly comprising a deckle base (or "deckle yoke") 50, seal member 90, wedge 95, and cam member 555. The seal member 90 is moveable between an extended position and a retracted position. As shown in FIGS. 1, 2, 4, 4A, and 4B, the seal member 90, when in its extended position, is configured to seat forcibly against an outlet orifice 850 of the die 100. Thus, when the seal member 90 is in its extended position, it is configured to seal a desired transverse extent of the orifice 850 of the die 100. As is perhaps best appreciated by referring to FIGS. 4, 4A, and 4B, the seal member 90 moves to the extended position in response to movement of the wedge 95 in a first direction, and the seal member moves to the retracted position in response to movement of the wedge in a second direction. The wedge 95 has a wedge surface 99 that rides on the cam member 555, which can optionally be a fulcrum cam member, during movement of the wedge in the first and second directions. This movement in the first and second directions may be along, or parallel to, the transverse axis 5, as shown in FIGS. 1, 4B, 10, and 16.

Figure 2:
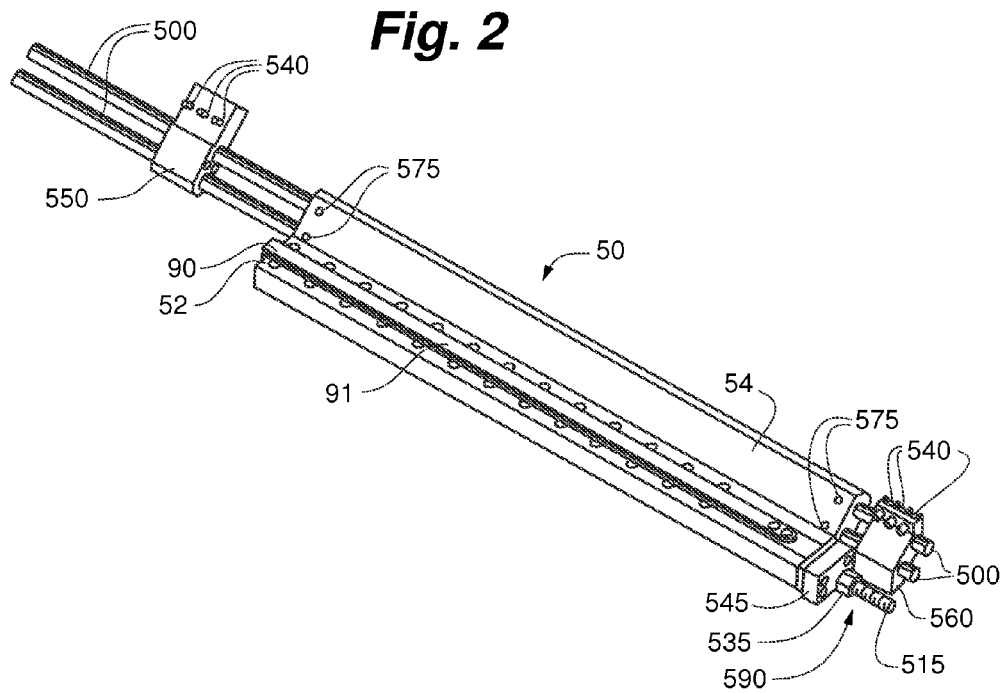
FIG. 2 is a perspective view of the external deckle assembly of FIG. 1, with the external deckle assembly shown in isolation.

FIGS. 1-4 and 8 show one embodiment of such a wedge-actuated external deckle. In FIG. 2, the external deckle assembly is shown in isolation, prior to being operatively mounted on an extrusion die. FIGS. 10-15 depict another embodiment of a wedge-actuated external deckle. In FIG. 10, the external deckle assembly is shown in isolation. FIGS. 16-19 depict yet another embodiment of a wedge-actuated external deckle. In FIG. 16, the external deckle assembly is shown in isolation. These embodiments involve a one-sided, cantilever type external deckle, where the external deckle is attached, or is configured to be attached, to only a single side of the die 100. In these embodiments, however, the wedge-actuated external deckle can alternatively be of the well-known boat-type configuration, where the external deckle is attached to both sides of a die. It will be appreciated that the wedge system can be incorporated beneficially into a wide variety of external deckles.

As shown in FIGS. 2, 3, 4, 10-13, and 17-18, the deckle base 50 comprises an arm portion 54 and a base portion 52. The base portion 52 comprises a housing or block. The base portion 52 of the deckle base 50 carries the wedge 95 and the seal member 90. As shown in FIGS. 3, 11-13, and 18, the base portion 52 of the deckle base 50 has (optionally a block or housing thereof defines) a channel 565 in which the wedge 95 and the seal member 90 are mounted removably when the external deckle is operatively assembled. This is advantageous in that it facilitates easy disassembly, removal, and replacement of the seal bar 90, wedge 95, and cam members 555.

As shown in FIGS. 3, 11-13, and 18, the channel 565 is elongated in the transverse direction. The wedge 95 is received in the channel 565, and the wedge itself defines a transversely elongated channel in which the seal member 90 is received, optionally by being mounted removably therein. These details, however, are merely exemplary; they are not limiting to the invention.

In FIGS. 4A, 4B, 10-12, 14, 16, and 17, the seal member 90 and wedge 95 are discrete, separate bodies. This, however, is not strictly required. For example, the seal member 90 and wedge 95 could alternatively be defined by a single integral body. In some cases, the wedge is part of the seal member. This can be the case for any embodiment shown or described herein.

The arm portion 54 of the deckle base 50 comprises a housing or block. In FIGS. 1-3, 8, 10-13, and 15-17, the arm portion 54 is attached to one or more adjustment shafts 500 that enable the deckle base 50 to be moved transversely relative to a stationary end plate 70 of the deckle assembly, and/or relative to an outlet orifice 850 of the die 100, when the external deckle assembly is operatively mounted to the die. This, however, is not required. The present wedge features can be used beneficially on external deckles of many different designs. For example, the wedge system can be incorporated into an external deckle that rides on a conventional T-bar, as shown in U.S. Pat. No. 5,830,391. Moreover, the external deckle can be of the boat style, and the deckle base can therefore have two arm portions attached respectively to two generally opposed sides of a die.

Figure 4:
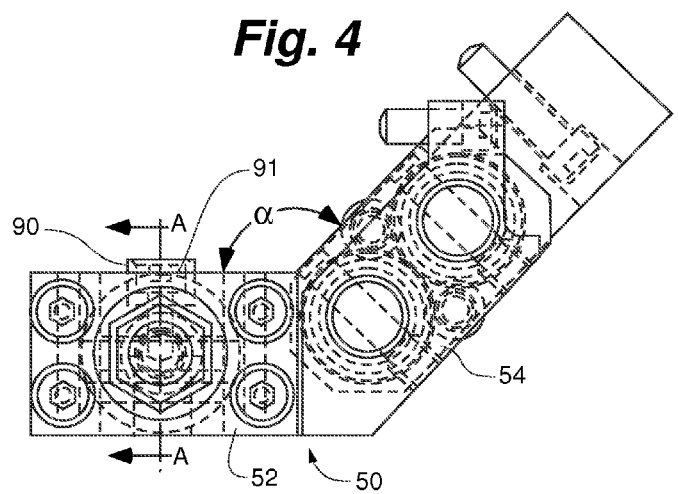
FIG. 4 is an end view of a deckle base of the deckle assembly of FIG. 2.
Figure 18:
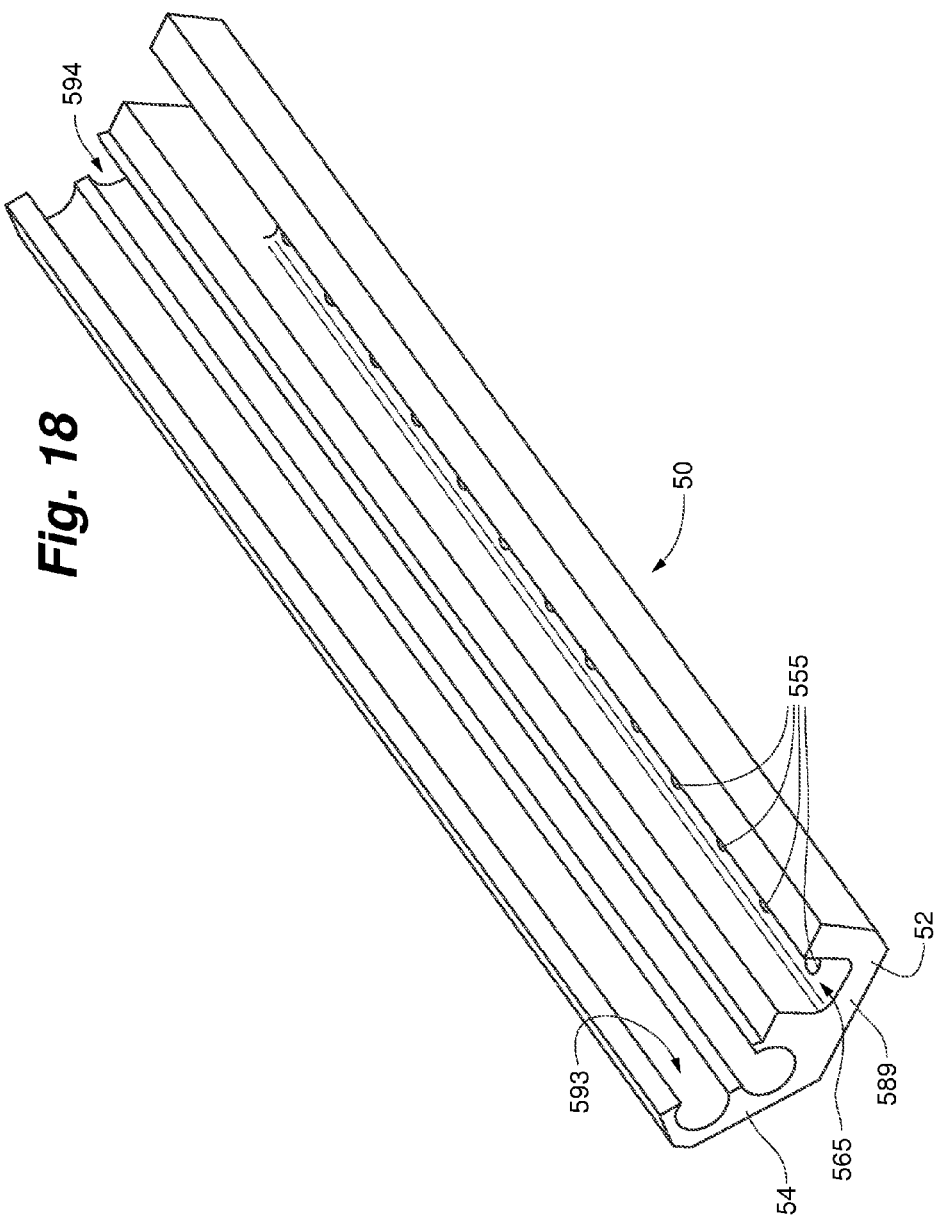
FIG. 18 is a perspective view of the deckle base of the external deckle assembly of FIG. 16.

As shown in FIGS. 4, 10, and 18, the arm 54 and base 52 portions of the deckle base 50 can be integral to each other (optionally being defined by a single body) or they can be discrete bodies that are rigidly connected to each other. In FIGS. 4, 10, and 18, the arm portion 54 extends away from the base portion 52 at an obtuse angle $\alpha$ (see FIG. 4). The base 52 portion comprises a transversely elongated housing portion or block portion, and the arm portion 54 comprises a transversely elongated housing portion or block portion. As noted above, however, different configurations can be used for the deckle base 50.

Figure 4A:
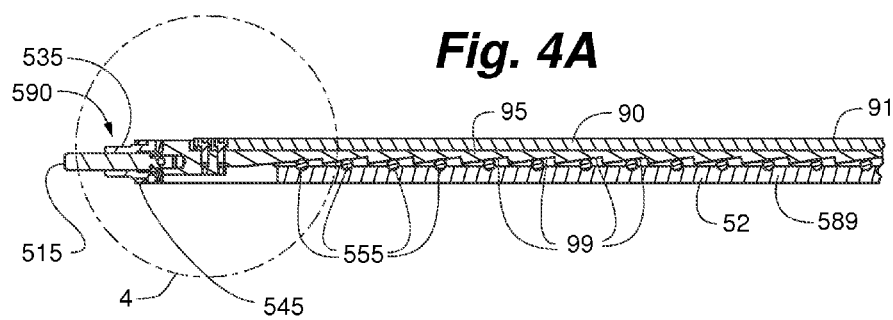
FIG. 4A is a partially broken-away, cross-sectional view of the deckle base of FIG. 4, the cross section being taken along lines A-A of FIG. 4.
Figure 4B:
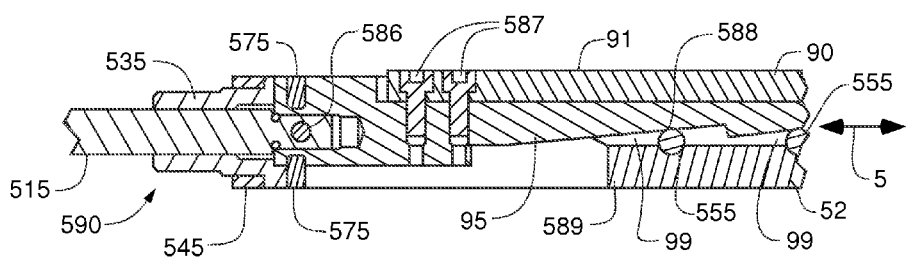
FIG. 4B is a broken-away view of detail section 4 from FIG. 4A.

Referring to FIG. 4B, between the wedge surface 99 and the cam member 555, there may be essentially only line contact. This can be accomplished in various ways. For example, the wedge surface 99 can ride on (cam with and/or roll over) a radiused surface 588 of an elongated cam member 555. In some cases, the cam member 555 comprises an elongated body, such as a pin or rod. The cam member 555, for example, can be a pin, roller, or another body having a cylindrical configuration.

The external deckle assembly shown in FIGS. 2-4B includes a second fulcrum cam member 555 (see FIGS. 4A and 4B), and the wedge 95 comprises an elongated wedge bar having two spaced apart wedge surfaces 99 that ride respectively on the first and second fulcrum cam members 555 during movement of the wedge in the first and second directions. The wedge bar is elongated in the transverse direction, that is, parallel to the long dimension of the orifice 850 of the die 100. In FIGS. 4A and 4B, the elongated wedge bar has a series of wedge surfaces 99 that ride on respective fulcrum cam members 555 during movement of the wedge in the first and second directions. The same is true for the wedge 95 shown in FIGS. 10-12 and 14, and for the wedge 95 shown in FIGS. 16 and 17. In FIGS. 4A and 4B, each wedge surface 99 defines an angled ramp, which is angled relative to a top sealing surface 91 of the seal member 90. Each ramp is at an acute angle, preferably less than 30 degrees, relative to the top sealing surface 91 of the seal member 90. The angled ramps ride on (cam with and/or roll on) respective cam members 555 so as to create a wedging action, when the wedge 95 is moved transversely, that causes the seal member 90 to move between retracted and extended positions.

Thus, relative transverse movement of the wedge 95 and a base portion 52 of the deckle base 50 causes the seal member 90 to move toward (against) or away (apart) from the orifice

850 of the die 100. This transverse movement is directed generally parallel to the long dimension of the orifice 850 of the die 100.

Figure 3:
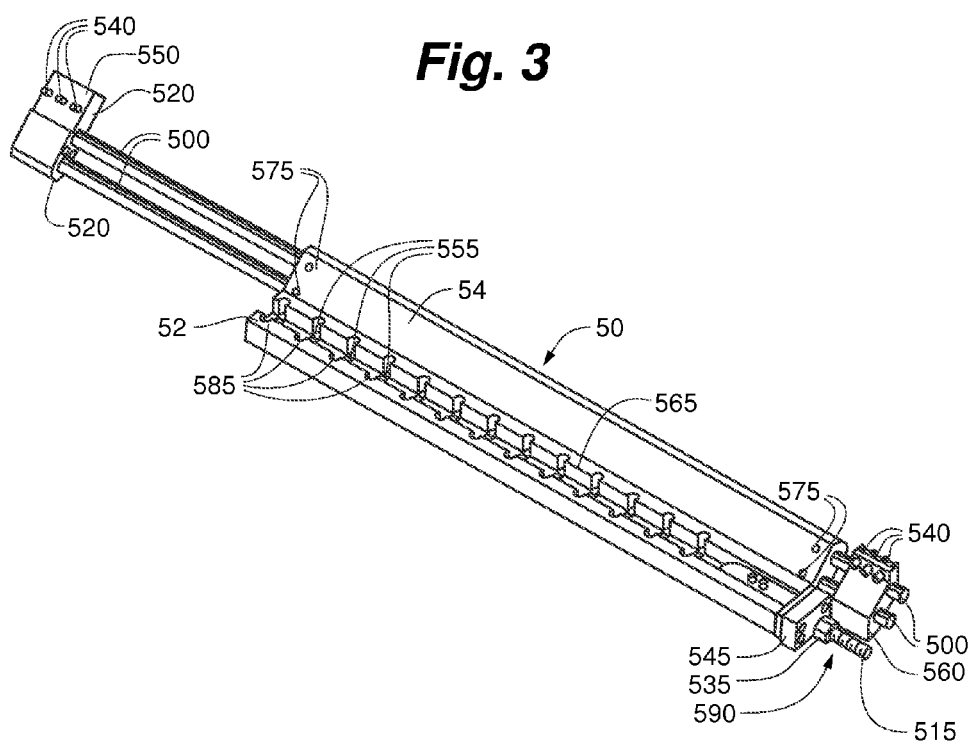
FIG. 3 is a perspective view of the external deckle assembly of FIG. 2, with the external deckle assembly shown in a partially disassembled state.

As shown in FIGS. 3, 4A, 4B, 11, 13, 15, and 18, the cam members 555 are discrete bodies mounted at spaced-apart locations on the deckle base 50. The cam members 555 can optionally be pins. As shown in FIGS. 3, 4A, and 4B, each pin can be positioned in a semi-cylindrical recess defined by the base portion 52 of the deckle base 50. In these cases, each pin can optionally be free to rotate (about its long axis). Thus, when the wedge 95 moves transversely relative to the pins, the resulting wedging action may involve each pin rotating under, and/or camming with, the wedge surface 99 that bears upon the pin. It is not necessary, however, that the pin or other cam members be free to rotate. Moreover, the term cam member, as used herein, includes situations where the pins, spheres, or other like members simply rotate to accommodate the transverse movement of the wedge; there may or may not be camming of the wedge surfaces and the cam members.

In the embodiments of FIGS. 10-15 and 16-19, the cam members 555 are spheres mounted at spaced-apart locations on the deckle base 50. As is best seen in FIGS. 11, 13, 15, and 18, each sphere can be positioned in a semi-spherical recess defined by the base portion 52 of the deckle base 50. In these cases, each sphere can optionally be free to rotate. Thus, when the wedge 95 moves transversely relative to spheres, the resulting wedging action may involve each sphere rotating under, and/or camming with, the wedge surface 99 that bears upon such sphere. It is not necessary, though, that the spheres be free to rotate. For example, they can be secured to, or integral to, the base portion 52 of the deckle base 50. In other cases, they may be prevented from rotating by friction forces, the manner in which they are mounted on the deckle base 50, or both. Furthermore, a combination of spheres, pins, and/or other types of cam members can be used.

Each cam member 555 preferably comprises a radiused bearing surface on which the corresponding wedge surface 99 rides during transverse movement of the wedge 95. Thus, the cam members 555 can advantageously be radiused. Two exemplary cam member configurations include the spheres and pins described above. Many other cam member configurations can be used.

Figure 15:
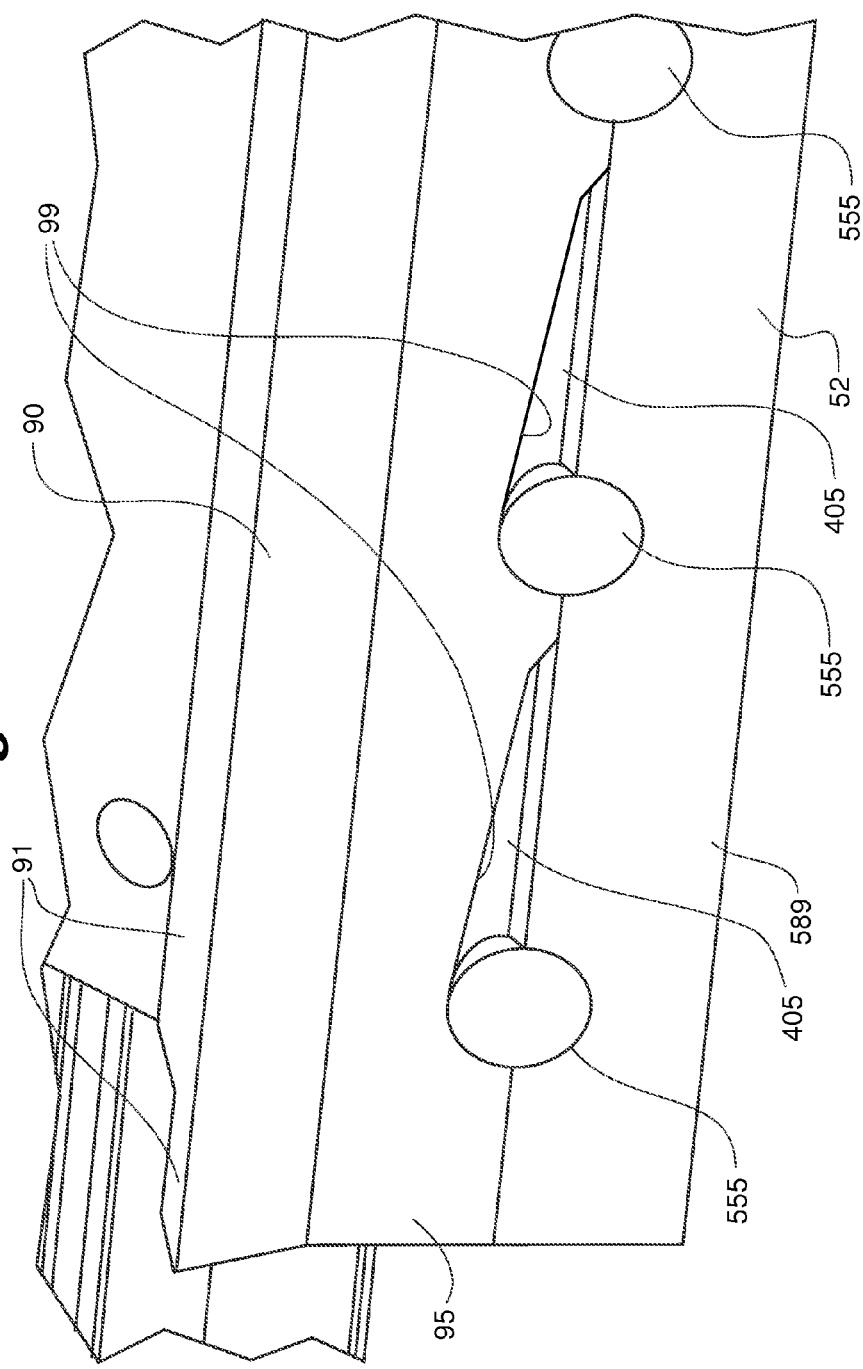
FIG. 15 is a broken-away cross-sectional detail view of a portion of the external deckle assembly of FIG. 10.
Figure 16:
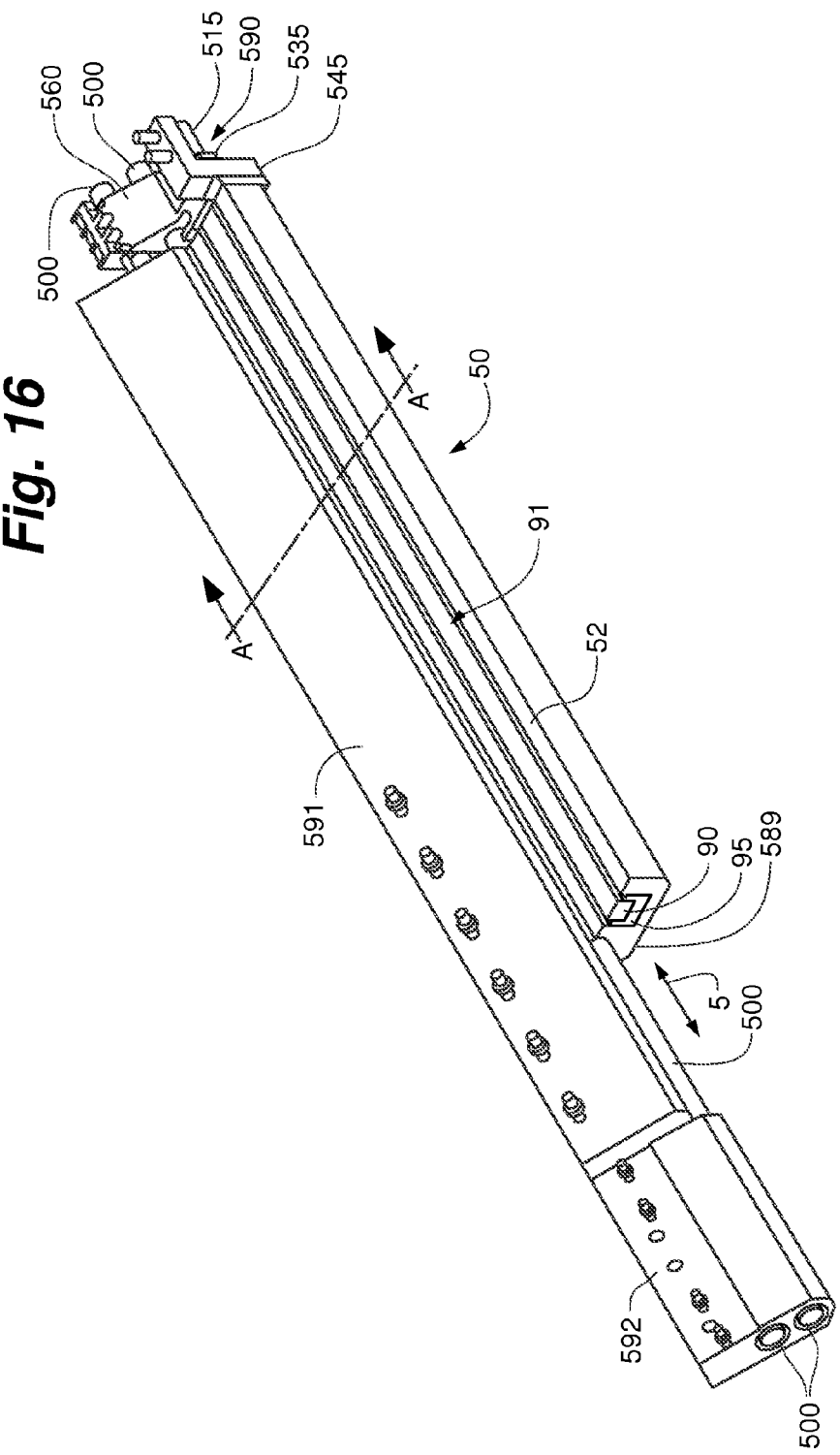
FIG. 16 is a perspective view of an external deckle assembly in accordance with another embodiment of the invention.

As is best seen in FIGS. 4A, 4B, and 15, each cam member 555 preferably is a fulcrum cam member. In these cases, each cam member 555 bears against a limited transverse extent of the corresponding wedge surface 99. The limited transverse extent preferably is less than 30%. In some cases, there may be substantially only line contact between each fulcrum cam member 555 and the corresponding wedge surface 99 when the inclined wedge surface is riding along the cam member.

The cam members 555 need not be radiused. For example, square or triangular pins may be used. Moreover, the camming surface of each fulcrum cam member 555 can optionally be defined by a sharp corner or edge.

In FIGS. 3, 11, 13, and 18, it can be appreciated that the cam members 555 are removable, replaceable parts. The illustrated pins and spheres are replaceable wear parts. In some cases, they are bronze pins or ball bearings that can be readily removed and replaced once they become sufficiently worn or damaged. Alternatively, such pins or ball bearings can be formed of steel, and may wear much more slowly.

With continued reference to FIGS. 3, 11, 13, and 18, the base portion 52 of the illustrated deckle base 50 has a channel 565 in which the cam members 555, wedge 95, and seal member 90 are mounted operably and removably. When it is necessary or desirable to remove and replace one or more of the cam members 555, the operator can remove the wedge subassembly 536 (see FIGS. 11 and 12) from the channel 565 (after removing fasteners connecting the wedge subassembly to the deckle base) to provide access to the cam members. Removing the wedge assembly from the channel 565 preferably provides access to all the cam members 555. The worn cam member(s) can then be replaced, after which the wedge subassembly 536 can be reassembled in its operative position in the channel 565.

The embodiments shown in FIGS. 1-4B, 8, and 10-19 are representative of a broader embodiment group wherein an external deckle comprises a wedge subassembly that includes a wedge and a seal member (which can optionally be parts of a single integral body), where the wedge and seal member are moveable transversely together relative to a base portion of the external deckle when operatively assembled in a channel of the base portion, and where the wedge subassembly is configured to be removed as a unit from the channel to provide an operator with access to a plurality of cam members. As noted above, the cam members may be exposed to the channel and thereby made readily removable.

In FIGS. 1-4A, 4B, 10-12, and 16, the external deckle assembly has an actuator 590 operably coupled with the wedge 95 such that the actuator can be used (operated) to move the wedge in the first and second directions. The actuator 590 comprises an adjustment member 535 that when rotated in one direction causes the wedge 95 to move in the first direction and when rotated in another direction causes the wedge to move in the second direction.

As best seen in FIGS. 2, 3, 4A, 4B, and 10-12, the actuator 590 can optionally comprise a rotatable adjustment member 535 coupled threadingly with an elongated fastener 515, such as an adjustment bolt, that is attached to the wedge 95. The illustrated adjustment member 535 is internally threaded, and the elongated fastener 515 is externally threaded. Referring to FIG. 4A, the externally threaded fastener AM is anchored to the wedge 95 by a pin 586, which prevents the fastener 515 from rotating relative to the wedge. The adjustment member 535 is mounted rotatably on an end of the deckle base 50 by a retainer 545, such as a retainer block. By rotating the adjustment member 535, the elongated fastener AM is forced to move axially along the transverse axis 5. This happens by virtue of the threaded engagement between the rotating internally threaded adjustment member 535 and the non-rotating adjustment screw AM. The resulting axial movement of the elongated fastener 515 forces the wedge 95 to move along the transverse axis 5, thereby causing the wedge to cam with (and/or roll over) the cam members 555. Due to the inclined (or "ramped") configuration of the wedge surfaces 99, the resulting camming and/or rolling action moves the seal bar 90 between its retracted and extended positions. The embodiment of FIGS. 10-15 is provided with this same type of actuator system, as best seen in FIGS. 10-12. The embodiment of FIGS. 16-19 is also provided with this type of actuator system, as best seen in FIG. 16.

In other cases, an externally threaded adjustment member (such as an adjustment bolt) is attached to the wedge such that the adjustment member is free to rotate about its axis relative to the wedge, while an internally threaded member attached non-rotatably to the deckle base is threadingly coupled to the threaded adjustment member. In these cases, rotating the externally threaded adjustment member causes the above-noted wedging action, forcing the wedge to move along the transverse axis, hence causing the wedge to cam with, and/or roll over the cam members, which due to the inclined configuration of the wedge surfaces results in the seal bar moving between its retracted and extended positions.

As shown in FIGS. 4A, 4B, 12, 14, and 15, the wedge 95 comprises an elongated wedge bar having a series of wedge surfaces 99 that ride on respective cam members 555 during movement of the wedge in the first and second directions. The seal member 90 is an elongated seal bar, which preferably is attached removably to the wedge bar 95. The seal member 90 can be formed of brass, carbon Teflon, or another material that will not scratch or otherwise damage the die lips.

As shown in FIGS. 4A, 4B, 10, and 15-17, the wedge bar 95 is located between a bottom wall 589 of the deckle base 50 and the seal member 90. Rotating the actuator's adjustment member 535 causes the wedge bar and the seal bar to move together as a unit in the first or second direction relative to the bottom wall 589 of the deckle base 50. The deckle base 50 defines a channel 565 in which the elongated wedge bar 95 and the cam members 555 are mounted removably. While the illustrated embodiments show the wedge bar and seal member as separate bodies, this is not required. For example, the wedge bar itself can define the top sealing surface 91.

Figure 8:
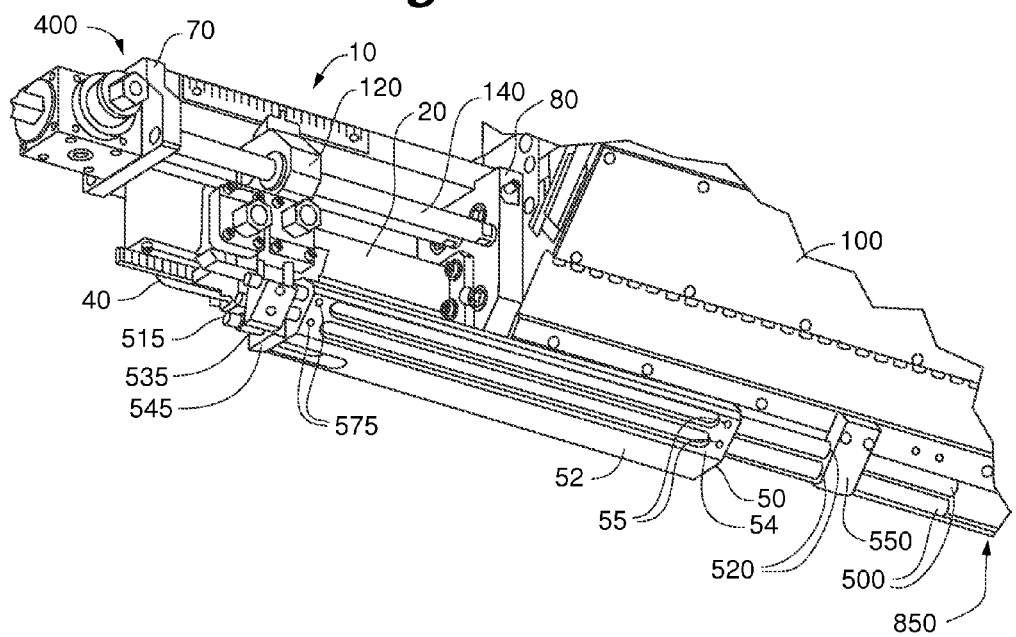
FIG. 8 is a partially broken-away perspective view of an extrusion die on which there is mounted a deckle system that includes an external deckle assembly in accordance with certain embodiments of the invention.
Figure 13:
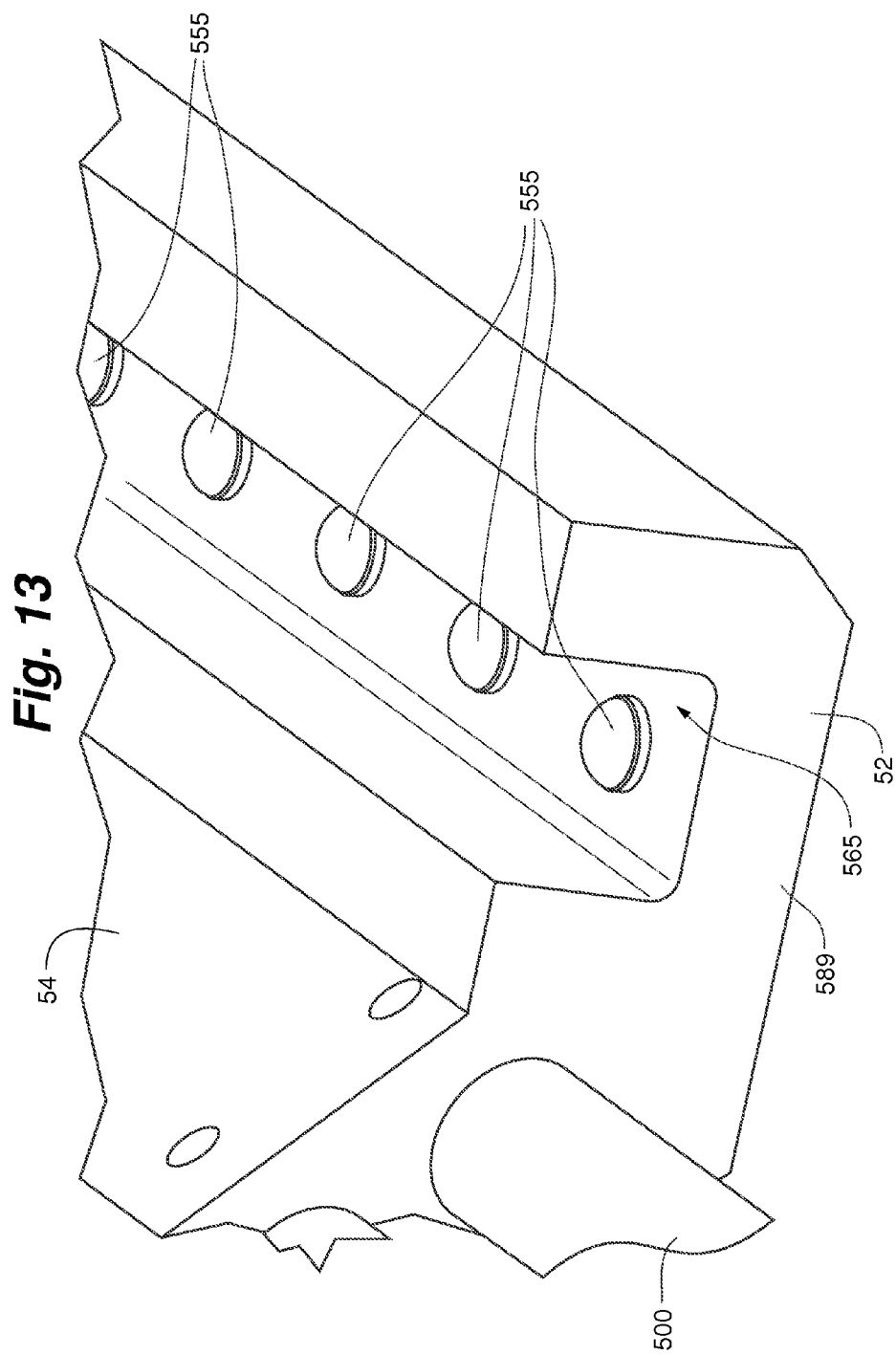
FIG. 13 is a broken-away partially-exploded perspective detail view of a portion of the external deckle assembly of FIG. 11.

FIGS. 1 and 8 show the external deckle assembly mounted operably to an extrusion die 100. The die 100 can be provided in a variety of conventional forms, as well known to people skilled in this field. The external deckle assembly can be used with a variety of different dies; the particulars of the die itself are not limiting to the invention.

As shown in FIGS. 9A and 9B, the extrusion die 100 has an internal flow passageway 801 leading to an outlet orifice 850. Referring to FIGS. 1 and 8, the die 100 has an external deckle assembly comprising a deckle base 50 mounted so as to be moveable relative to the orifice 850 of the die 100 so as to cover (or "block") an adjustable extent of the orifice. The deckle base 50 carries a seal member 90 that is moveable between an open position and a sealed position. When the seal member 90 is in the sealed position, it is held forcibly against the orifice 850 of the die 100, whereas when the seal member is in the open position, it is either spaced apart from the orifice or held against the orifice with less force than when in the sealed position. The seal member 90 moves to its sealed position in response to movement of a wedge 95 in a first direction, and the seal member moves to its open position in response to movement of the wedge in a second direction. The wedge 95 comprises a wedge surface 99 that rides on a first cam member 555 during movement of the wedge in the first and second directions. The illustrated wedge 95 comprises a plurality of transversely spaced-apart wedge surfaces 99 that ride respectively on a plurality of transversely spaced-apart cam members 555 during transverse movement of the wedge.

The deckle base 50 can be moved along a transverse axis 5 relative to the orifice 850 of the die 100 so as to block a desired extent of the orifice. As noted above, the external deckle preferably has an actuator 590 operably coupled with the wedge 95 such that the actuator can be used (operated) to move the wedge along the transverse axis 5. The actuator 590 may comprise an adjustment member 535 that when rotated in one direction causes the wedge 95 to move in the first direction and when rotated in another direction causes the wedge to move in the second direction. By rotating the adjustment member 535 in the appropriate direction, the wedge 95 is made to move transversely so as to cam with, and/or roll along, the cam member 555 in such a way that a resulting wedging action of the wedge moves the seal member 90 forcibly against the orifice 850 of the die 100, thereby sealing a desired transverse extent of the orifice. Conversely, when it is desired to move the sealing member 90 to its open position, the adjustment member 535 is rotated in the opposite direction, thereby moving the wedge 95 transversely back in the opposite direction, which due to the configuration of the wedge surface 99, allows the seal member to move away from the orifice.

In FIGS. 4A and 4B, the wedge 95 has a bottom wall comprising a plurality of angled wedge surfaces (or "inclined planes") 99 configured to define a series of ramps located sequentially along a transverse length of the wedge. A step connects one ramp to the next. The illustrated series of ramps therefore has a generally saw-blade-like configuration. This, however, is not required.

Figure 14:
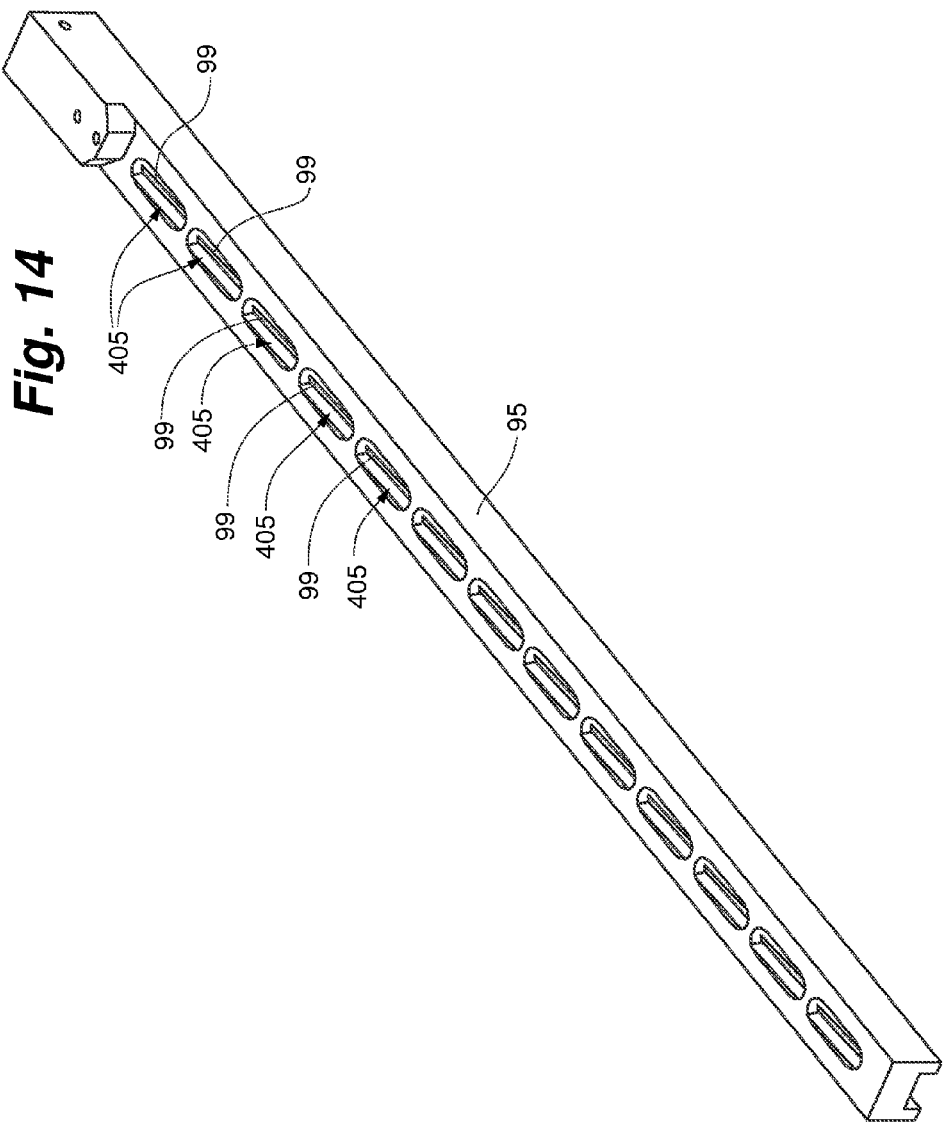
FIG. 14 is a perspective view of a wedge bar that can be used in the external deckle assembly of FIG. 13.

Another wedge 95 design is shown in FIGS. 10-15 and 16-19. The wedge 95 has a plurality of transversely spaced-apart grooves 405. Each groove 405 is relatively shallow at one end and relatively deep at the other end. An inclined surface defining the bottom of each groove 405 forms at least part of the wedge surface 99. This is best seen in FIGS. 12, 14, and 15. The cam member 555 comprises a sphere, such as a ball bearing, that is received in a groove 405 when operatively assembled. Each groove 405 can define a transversely elongated, inclined track that rides on a sphere received in that groove during relative transverse movement of the wedge 95 and the base portion 52 of the deckle base 50.

In another group of embodiments, the invention provides an external deckle assembly having an advantageous alignment shaft system for conveying the external deckle. Some of these embodiments provide a one-sided cantilevered external deckle system comprising two alignment shafts 500 (which preferably are generally parallel to a transverse axis 5) and a deckle base 50 that is movable along the transverse axis.

FIGS. 1 and 8 show one embodiment of a deckle system 10 comprising an external deckle system operatively mounted on an extrusion die 100. Here, the deckle system 10 is shown comprising two elongated alignment shafts 500 extending through a section of the deckle base (or "yoke") 50 and through a bearing block 550 (e.g., through a housing of the block). The illustrated bearing block 550 is attached to the die 100 and includes (e.g., defines) passageways with bushings 520 to facilitate sliding movement of the alignment shafts 500 extending therethrough. In this particular embodiment, the deckle base 50 is attached (e.g., rigidly) to the alignment shafts 500, optionally with set screws 575. As such, the deckle base 50 and the alignment shafts 500 are configured to move together as a unit (i.e., conjointly) along a transverse axis (e.g., in either transverse direction indicated by the arrows 5 in FIG. 1) relative to the bearing block 550 by virtue of the alignment shafts 500 sliding through the bearing block 550. This is also the case with the external deckle assembly of FIG. 10 when operatively mounted to an extrusion die in the same manner described above and shown in FIGS. 1 and 8.

In the embodiments of FIGS. 1, 8, and 10, the deckle base 50 is shown attached to the alignment shafts 500 proximate the ends of the shafts 500 distal from the bearing block 550. The deckle base 50, however, is not required to be positioned at any specific location on the alignment shafts 500. Moreover, while the deckle system 10 is shown with two alignment shafts 500, this is not strictly required. In alternate embodiments, the deckle system has only one alignment shaft. In preferred embodiments, though, the system includes two alignment shafts. Thus, three or more alignment shafts could be used.

In some embodiments, the alignment shafts 500 are generally cylindrical, optionally having a circular cross section. This is shown, for example, in FIGS. 1, 8, 10, and 16. In other embodiments, the alignment shafts have a cross section that is an ellipse, a polygon, or another geometric shape.

In the embodiment of FIGS. 1-3 and 8, the bearing block 550 can be positioned distally from the deckle base 50, and an optional locking block 560 can be attached (via fasteners 540) to the alignment shafts 500 proximal to the deckle base 50. In the embodiment illustrated, the locking block 560 is configured to move together as a unit with the deckle base 50 and the alignment shafts 500. While the locking block 560 is shown attached proximate the distal ends of the alignment shafts 500, this need not always be the case. In fact, the locking block can be omitted in some cases.

In the embodiments of FIGS. 1, 8, 10, and 16, the deckle system (or assembly) 10 includes a movable deckle carrier (or "adjustment arm") 120 to which the deckle base 50 is mounted (directly or indirectly) such that transverse movement of the deckle carrier (which may cause transverse movement of one or more internal deckles) adjusts the position of the deckle base 50 along a transverse axis 5, e.g., relative to the die 100. FIG. 8 shows the external deckle of one embodiment after it has been moved inwardly relative to the die 100, as compared to the position shown in FIG. 1.

When provided, the deckle carrier 120 preferably is configured for transverse movement relative to (e.g., selectively toward or away from) the die 100 and/or relative to an end plate 80 of the deckle assembly 10. In the embodiments illustrated, the deckle carrier 120 is mounted for transverse movement along a plurality of transversely extending elongated support beams (or shafts) 140. Here, the beams 140 extend between a first end plate 80, which is configured to be mounted to die 100, and a second, distal end plate 70, which is distal from the die 100 when the system is operatively assembled. Preferably, these end plates 70, 80 are fixed members that remain stationary during movement of the deckle carrier 120. The illustrated support beams 140 are parallel to each other and perpendicular to the end plates 70 and 80, although this may not always be the case. The illustrated beams 140 are cylindrical, although this too is not required. In other embodiments, the support beams have a cross-section that is an ellipse, a polygon, or another geometric shape.

FIGS. 1 and 8 show the deckle carrier (or "adjustment arm") 120 in two different positions. In FIG. 8, the deckle carrier 120 has been moved further inwardly relative to the die compared to the position shown in FIG. 1.

When provided, the deckle carrier 120 can be moved transversely by any conventional hydraulic or mechanical drive system 400. In some embodiments, the drive system 400 comprises a conventional gear box, a conventional motor, or both.

Thus, transverse movement of a deckle carrier 120 preferably adjusts the position of (e.g., causes movement of) the deckle base 50 relative to the die 100 and/or relative to a stationary end plate of the deckle assembly. The external deckle can thus be positioned so as to seal a desired extent of the die's orifice. The external deckle, for example, can carry a seal bar 90 configured to be seated forcibly against the die's orifice 850. Accordingly, the present external deckle assembly can be adapted to block an adjustable extent of the die's orifice 850. As will be apparent from the present teachings, transverse movement of the deckle carrier 120 towards the die 100 preferably causes transverse movement of the deckle base 50 in the same direction (e.g., towards the block 592 or block 550). Such movement increases the sealed extent of the die's orifice (i.e., increases the extent of the orifice sealed by the deckle base 50) and decreases the open extent of the die's orifice (the "open extent" of the orifice is not sealed by an external deckle). In the illustrated embodiments, transverse movement of the deckle carrier 120 away from the die 100 causes transverse movement of the deckle base 50 away from block 592 or block 550. Such movement decreases the sealed extent of the die's orifice, and increases the open extent of the die's orifice.

Thus, in some embodiments, the uncovered transverse extent of the orifice 850 (e.g., through which extrudate may be free to exit), and is adjustable by moving the deckle base 50 relative to orifice. Reference is made to FIGS. 1, 8, 10, and 16.

As was described above in greater detail (when referring to FIGS. 2-4), the deckle base 50 can optionally comprise a seal member 90 configured to move between an open position and a sealed position. When in the sealed position, the seal member 90 is held forcibly against the orifice 850 of the die 100 and, when in the open position, the seal member is spaced apart from the outlet orifice or is held against the outlet orifice with less force than when in the sealed position. Some embodiments of this nature provide an adjustment member 535 that, when operated, causes the seal member 90 to move between the sealed and open positions.

Figure 17:
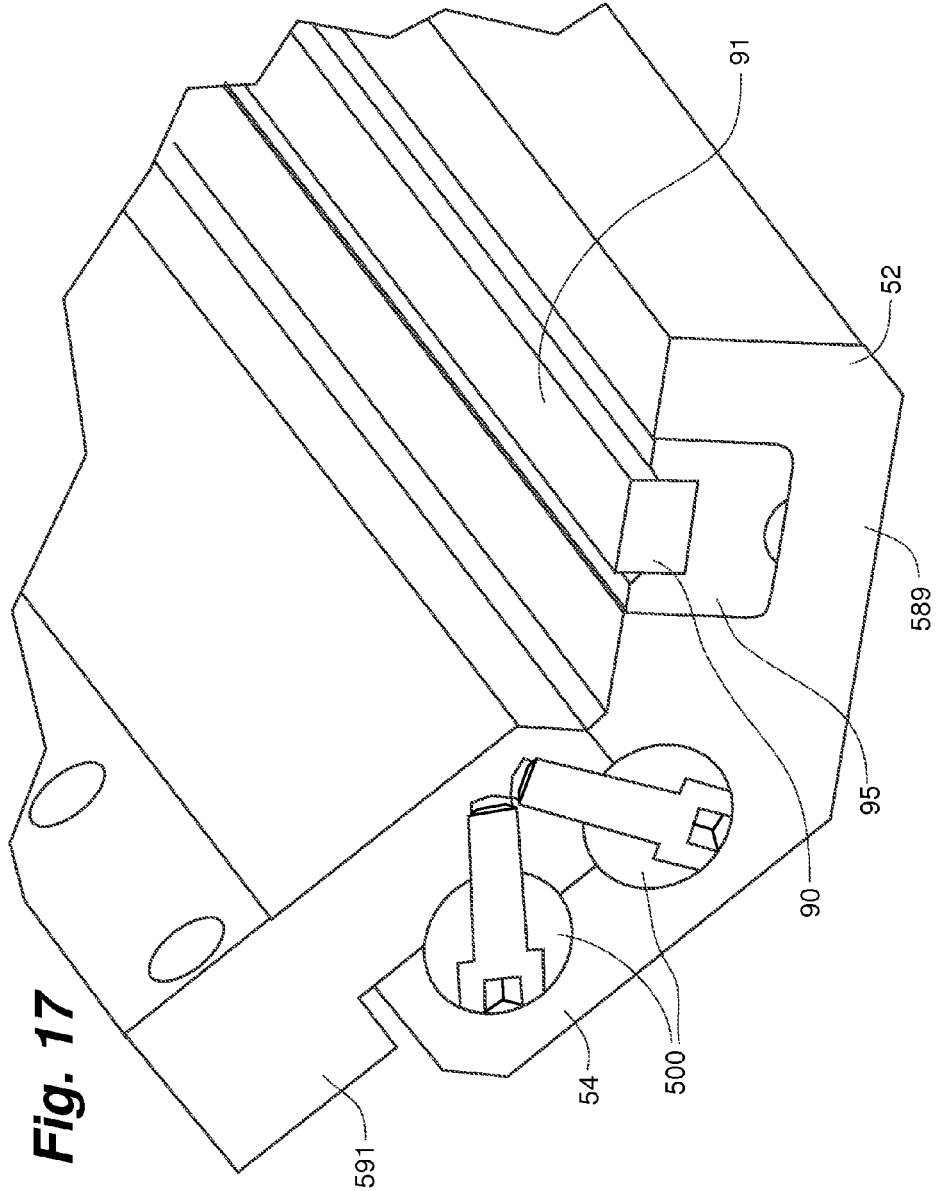
FIG. 17 is a partially broken-away cross-sectional view of the external deckle assembly of FIG. 16, taken along lines A-A.

In embodiments like that shown in FIGS. 16-19, the external deckle assembly comprises one or more (optionally two or more) alignment shafts 500 along which the deckle base 50 is configured to move (e.g., slidably). Here, the assembly includes a first attachment block 592 that is configured to be mounted in a fixed position on a die. The alignment shafts 500 shown in FIGS. 16 and 17 are not slidable relative to the first attachment block 592, but rather are secured fixedly to this block. Likewise, the alignment shafts 500 here are secured fixedly to locking block 560. In this particular example, the locking block 560 is mounted in a fixed position to a stationary component of the outer end plate 70 assembly. Thus, in the embodiment of FIG. 16, the alignment shafts 500 are mounted in a stationary manner relative to the die. The two or more alignment shafts 500 in such embodiments can thus be mounted fixedly on the extrusion die 100 such that the alignment shafts remain stationary relative to the die when the deckle base 50 is sliding transversely along the alignment shafts.

As can be appreciated, some embodiments of the invention provide a one-sided cantilevered external deckle system comprising two alignment shafts 500 (which preferably are generally parallel to each other, to a transverse axis 5, or both) and a deckle base 50 that is movable along the transverse axis. Reference is made to FIGS. 1, 2, 10, and 16. Each of the two alignment shafts 500 is shown having a generally cylindrical configuration. This, however, is not strictly required. The deckle base 50 can beneficially be mounted on the two alignment shafts 500. In a preferred example, the deckle base 50 comprises an arm portion 54 and a base portion 52, the arm portion is mounted on the two alignment shafts 500, and the base portion carries a seal member 90 configured for movement between an open position and a sealed position, the seal member when in the sealed position is held forcibly against an outlet orifice 850 of the die 100, and the seal member when in the open position is either spaced apart from the outlet orifice or held against the outlet orifice with less force than when in the sealed position. These optional features have already been described.

The design shown in FIGS. 16-19 is representative of a broader embodiment group wherein a plurality of alignment shafts 500 are mechanically linked (e.g., bridged), optionally over at least 50%, at least 75%, or over substantially an entirety of the length of the shafts. One benefit of linking the alignment shafts 500, optionally continuously over a major length, is that greater rigidity and deflection resistance can be provided. Thus, some embodiments provide a plurality of generally parallel alignment shafts 500 that are each rigidly attached to a bridge member 591. The bridge member 591 can optionally be rigidly attached to the alignment shafts 500 such that it is carried against (optionally directly against) the shafts. The bridge member 591 can beneficially be carried against the alignment shafts 500 over a considerable length of the shafts (e.g., as specified by any one or more of the ranges noted above).

Figure 19:
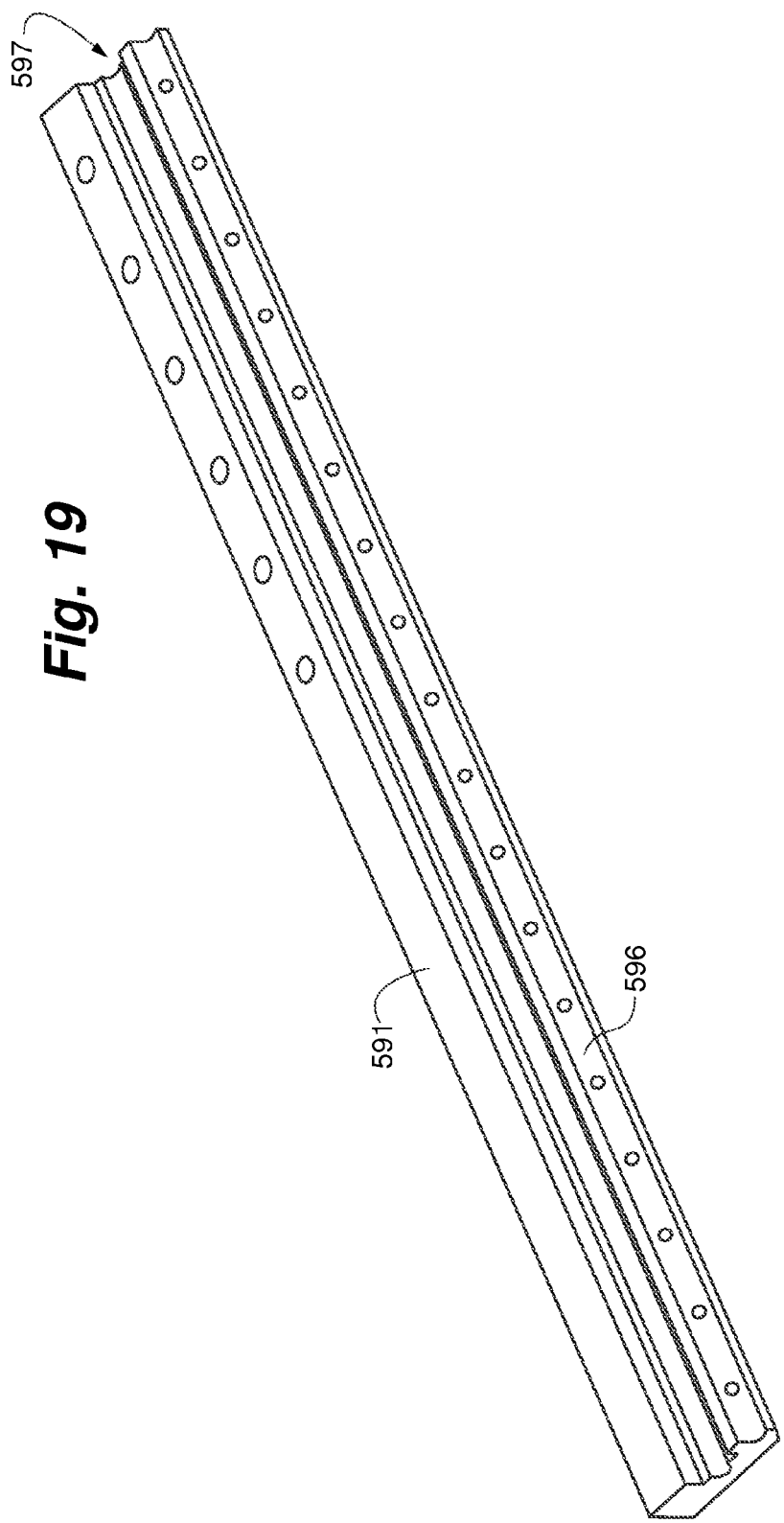
FIG. 19 is a perspective view of the shaft holder of the external deckle assembly of FIG. 16.

When provided, the bridge member 591 may, for example, define a plurality of transversely elongated recesses (optionally semi-circular recesses) 596, 597 in which respective alignment shafts 500 are received (e.g., fixedly received so as to be rigidly joined to the bridge member). Reference is made to FIGS. 17 and 19. Here, a plurality of fasteners (e.g., bolts) anchor each alignment shaft 500 rigidly to the bridge member 591. As shown in FIG. 19, the bridge member 591 may comprise (e.g., be) a transversely elongated bar formed by a single integral body. This, however, is not required. For example, a series of separate bridge members could alternatively be attached to the alignment shafts.

In embodiments like that of FIGS. 16-19, the bridged alignment shafts 500 are mounted in a stationary position relative to (e.g., on) the die, as described above. The external deckle base 50 in such embodiments is configured to move (e.g., slide) transversely along the bridged alignment shafts 500. The deckle base 50 in these embodiments can be of the nature (e.g., can have the configuration and any features) described above, provided it is configured to slide along the bridged alignment shafts 500. In FIGS. 16-18, the arm portion 54 of the deckle base 50 has (e.g., defines) two transversely elongated semi-circular recesses 593, 594. These recesses 593, 594 are defined by walls that extend about a major (i.e., more than 50% of the) circumferential extent of the alignment shaft 500 received in each such recess. This way, the deckle base 50 is retained on the alignment shafts 500 but is free to slide transversely along those shafts.

With an external deckle assembly like that shown in FIGS. 16-19, the deckle base 50 preferably is mounted (directly or indirectly) to a transversely moveable deckle carrier 120 of the deckle assembly. FIGS. 1 and 8 depict one such deckle carrier 120. When an external deckle system of the nature shown in FIGS. 16-19 is operatively assembled (e.g., on a die), the deckle base 50 preferably is configured to move transversely (relative to the alignment shafts) in response to (e.g., together with) the deckle carrier 120 moving transversely. As noted above, transverse movement of the deckle carrier 120 may also drive transverse movement of one or more internal deckle members.

Figure 5:
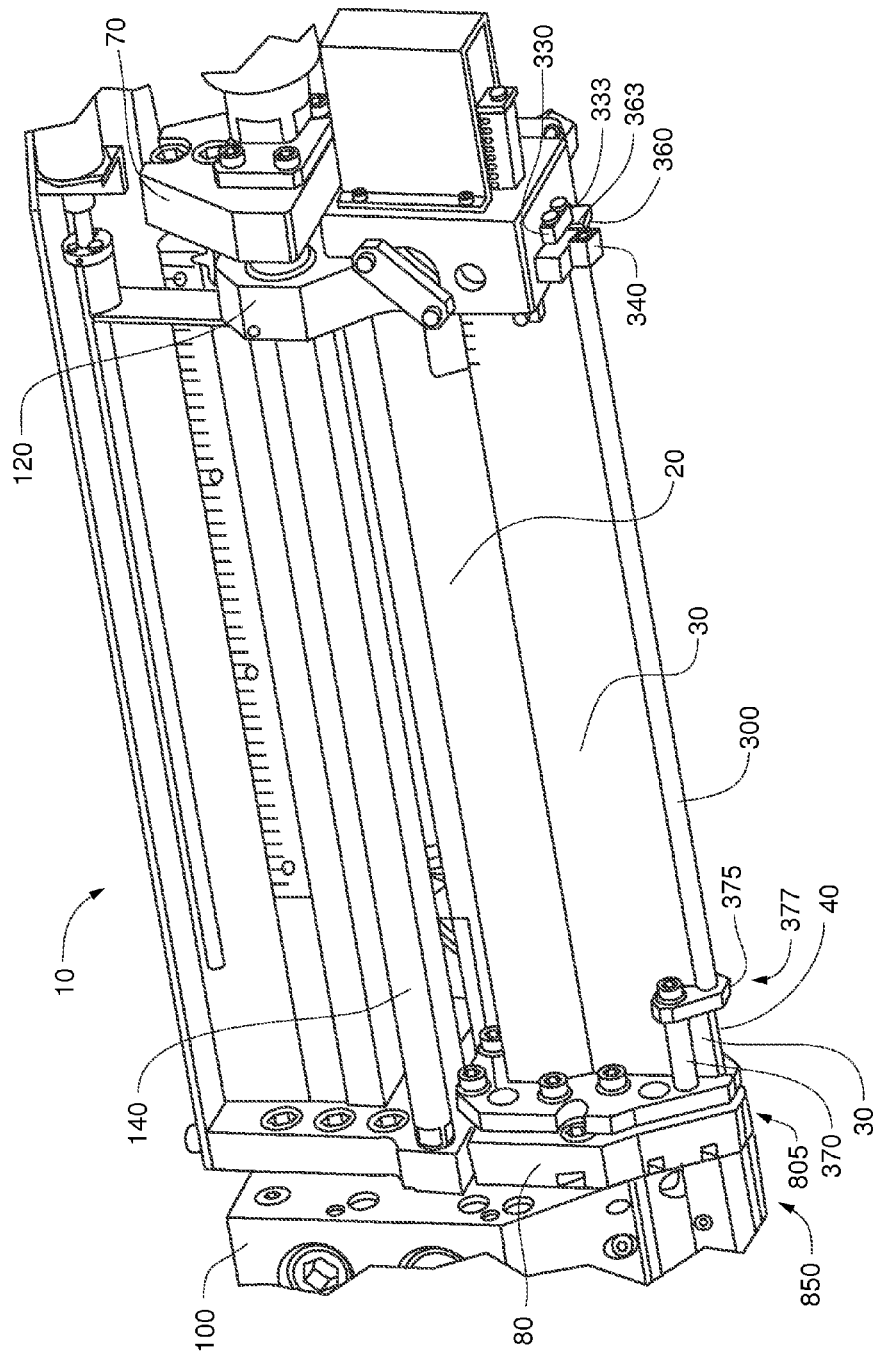
FIG. 5 is a partially broken-away perspective view of an extrusion die on which there is mounted a deckle system that includes a deckle rod support system in accordance with certain embodiments of the invention.
Figure 6:
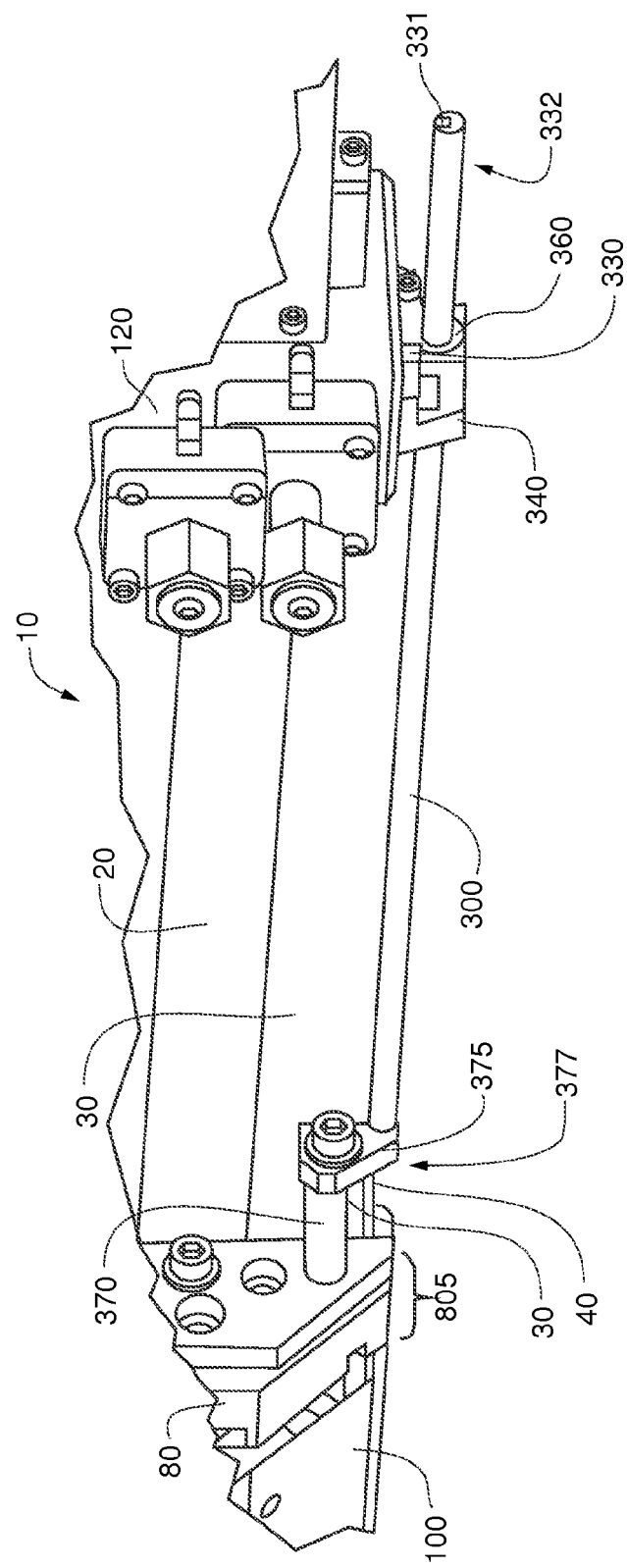
FIG. 6 is a broken-away perspective view of the extrusion die of FIG. 5, the die and deckle system being shown from a different perspective than in FIG. 5.

In another embodiment, the invention provides an extrusion die with an internal deckle assembly having an advantageous deckle rod support system. The following disclosure begins by describing the internal deckle assembly itself, and then describes the internal deckle assembly in combination with the extrusion die. FIGS. 5 and 6 depict an extrusion die with an internal deckle assembly having a deckle rod support system. The internal deckle assembly is part of deckle assembly 10. The internal deckle assembly includes an end plate assembly 805 configured to be mounted to an extrusion die 100. The internal deckle assembly holds a deckle rod 40 and includes a moveable deckle carrier (or "adjustment arm") 120. The deckle carrier 120 is configured to move transversely relative to the end plate assembly 805, and/or relative to one or more support beams 140 along which the deckle carrier moves. The internal deckle assembly includes a transversely elongated support 300 engaged with the deckle rod 40 over a desired length, which is referred to herein as the "supported length" of the deckle rod. The support 300 is configured to restrain the supported length of the deckle rod 40 against bending. Preferably, the support 300 (optionally in combination with an adjacent internal deckle member 30) prevents any significant bending of the deckle rod over the supported length. In FIGS. 5 and 6, the support 300 is mounted such that when the deckle carrier 120 moves transversely relative to the end plate assembly 805, the support does not move transversely, but rather is retained in a fixed transverse position.

The support 300 is elongated in the transverse direction. It therefore provides support to the deckle rod 40 over a substantial length of the rod. In some cases, the length (in the transverse direction) of the support 300 is more than 70% as great as the length of the deckle rod 40. As noted above, the support 300 preferably is configured (optionally in combination with an adjacent internal deckle member 30) to prevent any substantial bending of the deckle rod 40 over the supported length of the rod. In some cases, the supported length is more than 50% of the length of the deckle rod 40. The supported length will vary based upon the transverse position of the deckle rod relative to the die at a given time.

In FIGS. 5 and 6, the support 300 comprises a support shaft. The illustrated support shaft has a generally cylindrical configuration. This, however, is not required. For example, the shaft could alternatively have a cross section that is square, triangular, or otherwise polygonal. The shaft may comprise metal, such as steel.

Figure 7:
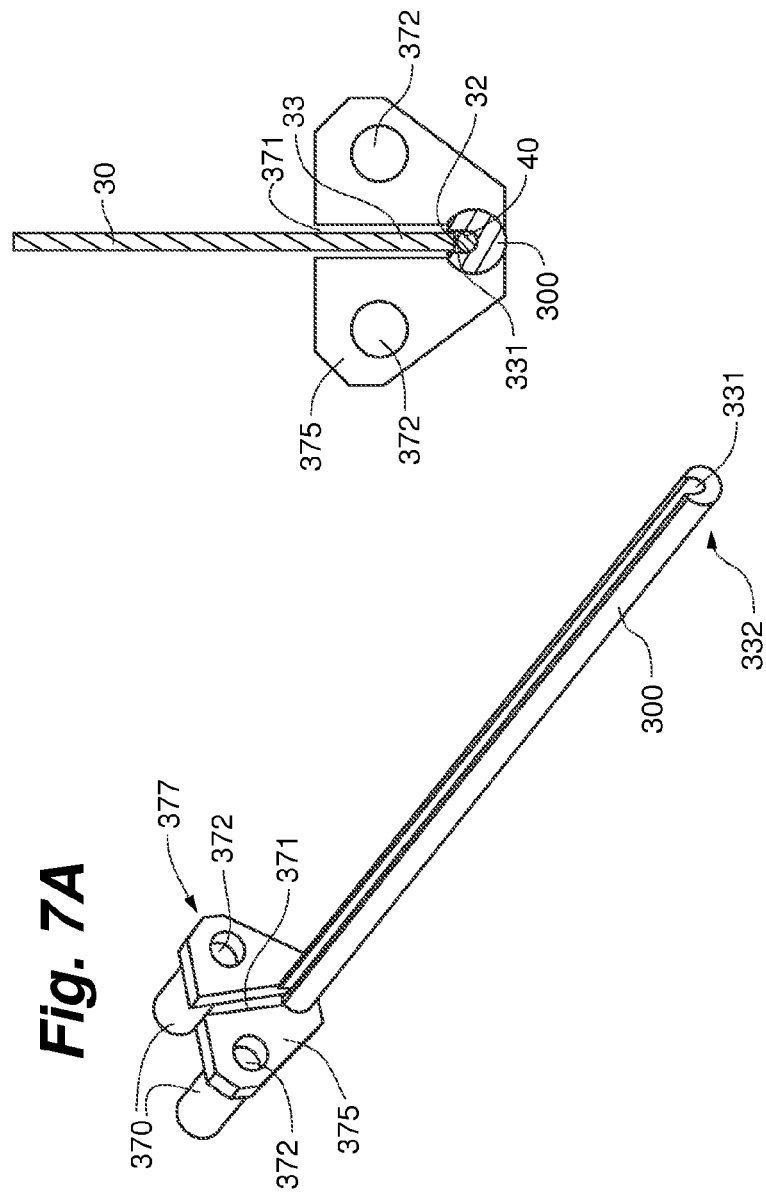
FIG. 7A is a perspective view of a deckle rod support system in accordance with certain embodiments of the invention.
FIG. 7B is a cross-sectional view of the deckle rod support system of FIG. 7A, with a deckle rod and an internal deckle member shown in assembly.

In FIGS. 7A and 7B, the support 300 has an elongated groove 331 in which the deckle rod 40 is received. The illustrated groove 331 extends along the entire length of the support 300. The size of the groove 331 preferably is selected such that: i) the deckle rod 40 can freely slide axially within the groove, and ii) the length of the deckle rod within the groove is prevented (optionally by both the support 300 and an adjacent internal deckle member 30) from bending substantially when the deckle rod slides axially relative to the support shaft. The deckle rod 40 can have a certain diameter, and the support shaft's groove 331 may have an interior diameter that is not more than twice as great as the rod's diameter. In some cases, an interior diameter of the groove 331 is substantially equal to (not more than 20% greater than) an exterior diameter of the deckle rod 40.

As is perhaps best appreciated in FIG. 5, the groove 331 can be configured to receive more than 70% of the deckle rod's length. Thus, the support 300 can be configured to support the deckle rod 40 over a considerable length, thereby serving as a particularly effective bending restraint.

The support 30 can take different forms. Rather than being a single elongated body, the support can comprise a series of bodies cooperating so as to collectively support the deckle rod over the desired length. If desired, such bodies could be spaced apart in an arrangement that still restrains the deckle rod against bending. More preferably, though, the support 30 provides continuous support over (optionally by embracing) the entire supported length of the deckle rod 40. The support could comprise telescoping support shafts, such as one that moves together with deckle carrier, and another that remains in a fixed transverse position during movement of the deckle carrier. Many other support configurations are possible.

In FIGS. 5 and 6, the deckle carrier 120 has an opening 363 in which the support 300 is slidably received. When the deckle carrier 120 moves inwardly relative to the end plate assembly 805, the illustrated support 300 is retained in its fixed transverse position and slides through the opening 363. The illustrated opening 363 is defined by a bushing 360 (optionally a bronze bushing) on a retainer block 340 that is mounted to the deckle carrier 120. When the deckle carrier 120 moves inwardly, the bushing 360 slides along the support shaft. This can be appreciated by comparing FIGS. 5 and 6.

FIG. 6 shows the support 300 after the deckle carrier 120 has been moved further inwardly relative to the die 100, as compared to the position of the deckle carrier shown in FIG. 5. When in the position of FIG. 6, the support 300 extends through the noted opening 363 and a distal length of the support projects transversely outwardly (away from the die) beyond the opening 363.

In FIGS. 5 and 6, the support 300 is supported at one end region by a mount 377 secured to the end plate assembly 805. More generally, the die-side end region of the support 300 can be mounted to any fixed component (one that does not move transversely during movement of the deckle carrier) of the deckle assembly 10 or the die 100. In FIGS. 5 and 6, the support 300 is also supported by the deckle carrier 120. The support shaft is disposed slidably in a bushing 360 carried by the deckle carrier 120.

The rod support system can be incorporated into a variety of different deckle systems. In FIGS. 5 and 6, the internal deckle assembly includes a first internal deckle member 20, which is carried by the deckle carrier 120 such that a transverse position of the first internal deckle member can be adjusted by moving the deckle carrier transversely relative to the end plate assembly 805 and/or relative to one or more support beams 140 along which the deckle carrier moves. The first internal deckle member 20 is a quill configured to be disposed in part within a die manifold 800 (see FIG. 9B). In FIGS. 5 and 6, the internal deckle assembly also includes a second internal deckle member 30, which is carried by the deckle carrier 120 such that a transverse position of the second internal deckle member can be adjusted by moving the deckle carrier transversely relative to the end plate assembly 805 and/or relative to one or more support beams 140 along which the deckle carrier moves. The second internal deckle member 30 is a secondary flag configured to be disposed in part within an internal flow channel 810 downstream from the manifold 800 (see FIG. 9B). It is to be appreciated, however, that the number, types, and configurations of the internal deckle members can be varied to accommodate different applications.

In FIGS. 5, 6, and 7B, the deckle system includes an internal deckle member 30 having a trailing edge (a downstream edge) 32 that is carried alongside the deckle rod 40. The deckle rod 40 is positioned between (optionally directly between, so as to be in sliding contact with both) the internal deckle member 30 and the support 300. As shown in FIG. 7B, the deckle rod 40 can optionally be substantially entirely surrounded collectively by the internal deckle member 30 and the support 300.

In FIG. 7B, the support 300 has a groove (or other recess or space) 331 in which a trailing end region 32 of an internal deckle member 30 is received when the internal deckle assembly is operatively assembled. The groove 331 is deep enough that, even when the deckle rod 40 is positioned operatively in the groove, the trailing end region 32 of the internal deckle member 30 projects into the groove (or other recess or space).

In FIG. 7B, the deckle rod 40 is supported against bending (optionally prevented from experiencing any bending) collectively by the support 300 and the internal deckle member 30.

The present rod support system can be used together with an external deckle assembly having any of the features described above with reference to FIG. 1-4B, 10-15, or 16-19. Thus, the rod support system can optionally be provided in combination with an external deckle assembly having: i) the wedge-actuated external deckle described above, ii) the external deckle alignment shaft conveyance system described above, or both i) and ii).

In some cases, the rod support system is used together with a one-sided, cantilevered external deckle assembly. For example, the cantilevered external deckle can be of the type shown in FIG. 1-4B, 8, 10-15, or 16-19. In other cases, the external deckle rides on a T-bar, e.g., of the nature shown in U.S. Pat. No. 5,830,391, or more advantageously of the nature described below with reference to FIGS. 9A and 9B. The rod support system can be used in a deckle assembly having an external deckle of the well-known boat-style configuration. It will therefore be appreciated that the rod support can be incorporated into a wide variety of deckle assemblies, including ones that have no external deckle.

FIGS. 5 and 6 depict an extrusion die 100 to which the internal deckle assembly is mounted. As noted above, the internal deckle assembly includes a deckle rod 40 and a deckle carrier 120 configured to move transversely relative to the die 100. The internal deckle assembly includes a transversely elongated support 300 engaged with the deckle rod 40 over a desired length (the "supported length") of the deckle rod. The support 300 restrains the supported length of the deckle rod 40 against bending. The support 300 preferably is mounted such that when the deckle carrier 120 moves transversely relative to the die 100, the support does not move transversely, but rather is retained in a fixed transverse position.

The supported length of the deckle rod 40 can be substantially the entire extent of the deckle rod that is located outside of the die 100. The supported length, however, will vary depending upon how far inwardly the deckle carrier 120 is moved. As noted above, the support 300 can advantageously comprise a support shaft having an elongated groove 331 in which the deckle rod 40 is received. In some cases, substantially the entire extent of the deckle rod 40 outside of the die 100 is received in the groove 331 of the support 300.

One non-limiting practical example will now be described with reference to FIGS. 5, 6, 7A, and 7B. The deckle rod has a diameter of 5/32 inch. The support 300 is an elongated generally cylindrical support shaft formed of steel, having an exterior diameter of ½ inch, and defining a cylindrical groove having an interior diameter of 3/16 inch. The shaft is mounted at its die-side end to a mount 377 of the configuration shown in FIGS. 7A and 7B. The mount 377 comprises two arms 370 extending from a plate 375 portion of the mount to the end plate assembly 805. This forms a rigid mount assembly that rigidly anchors the support shaft to the end plate assembly. The distal end region of the support shaft is received slidably in a bronze bushing 360, which has an interior diameter of ½ inch and is mounted to the adjustment arm 120 by a mount block 340. A support block 330 has a projection 333 that is carried against the distal end of the deckle rod 40 such that the rod is free to rotate relative to the support block. The projection 333 bears against the distal end of the deckle rod, such that when the deckle carrier 120 moves inwardly relative to the die, the projection pushes against the distal end of the deckle rod, thereby moving the rod inwardly relative to the die. These details are by no means required; they are merely exemplary.

In yet another group of embodiments, the invention provides an extrusion die having a one-sided (e.g., cantilevered) external deckle assembly that rides on a T-bar anchored to the die. As noted above, U.S. Pat. No. 5,830,391 shows an external deckle 21 that rides on a conventional T-bar 16. As can be appreciated by referring to FIG. 2 of the noted '391 patent, to remove the external deckle 21 from such a conventional T-bar 16, it is necessary to slide the external deckle all the way past a very end of the T-bar. The present embodiments provide a T-bar having a die-side end region that allows the external deckle to be more easily removed from the T-bar.

Referring to FIGS. 9A and 9B, the T-bar 1100 is anchored to an extrusion die 100 (e.g., to one side of the die). Here, the illustrated T-bar 1100 is anchored to the die 100 by a plurality of fasteners (such as bolts or other threaded fasteners) 540 extending from the T-bar into the die. The T-bar 1100 has a transversely elongated length extending between a die end 1151 and a distal end 1105. The T-bar 1100 has a generally T-shaped cross-sectional shape. A transversely elongated base portion 1120 of the T-bar 1100 is carried against (e.g., mounted to) the die 100. Two rail portions (or flange portions) 1130, which are spaced from the die 100, extend in opposite directions from the base portion 1120. A track space 1177 is defined between each rail portion 1130 and the die 100.

The illustrated T-bar 1100 has a distal end region 1157 that facilitates mounting and dismounting of the external deckle onto/from the T-bar. Thus, the illustrated T-bar 1100 has a mount structure (or mount configuration) 1150 at its distal end region 1157. The illustrated mount structure 1150 is defined by virtue of the T-bar's base portion 1120 extending all the way to (and defining) the T-bar's distal end 1105 while the two rail portions 1130 do not extend all the way to the T-bar's distal end 1105, but rather terminate at a location spaced from the distal end 1105, so as to define an open mount configuration at the T-bar's distal end region 1157. Thus, the distal end region 1157 of the illustrated T-bar 1100 is defined by a distal end section of the base portion 1120, and that end section has two angled surfaces (e.g., notches) 1153 that diverge in moving closer to the die, so as to form ramps that facilitate the mounting and dismounting of the external deckle onto/from the T-bar.

As noted above, in the embodiments involving a deckle assembly 10 and die 100 in combination, the die can be provided in any of a variety of conventional forms, as are well known to those skilled in this field. As shown in FIG. 9B, the die 100 can have a manifold 800, a preland channel 810, a final land channel 825, and an orifice 850. In these cases, a transition zone 820 commonly connects the preland channel 810 and the final land channel 825. The transition zone 820 may extend from a downstream end region of the preland channel 810 to an upstream end region of the final land channel 825. The transition zone 820 may comprise two confronting radiused or otherwise tapered wall sections, optionally extending from confronting upstream preland wall sections (which may define a preland channel 810 that is wider than the final land channel 825) to confronting downstream final land wall sections. When operatively assembled, a deckle rod 40 can be disposed in the transition zone 820. The present deckle systems/features can be used with a variety of different extrusion dies; the particulars of the die itself are not limiting to the invention. An extrusion die 100 having the features described in this paragraph can be provided in combination with any deckle system or deckle assembly described above (with any disclosed internal deckle assembly, external deckle assembly, or both).

While certain preferred embodiments have been described, it should be understood that various changes, adaptations and modifications may be made therein without departing from the spirit of the invention and the scope of the appended claims.

What is claimed is:

1. An extrusion die having an internal flow passageway and an outlet orifice elongated along a transverse axis, said internal flow passageway leading to said outlet orifice, and an external deckle assembly comprising a deckle base, a seal member, a wedge, and a first fulcrum cam member, said seal member being moveable between an open position and a sealed position, wherein said seal member when in said sealed position is held forcibly against said outlet orifice and when in said open position is either spaced apart from said outlet orifice or held against said outlet orifice with less force than when in said sealed position, said wedge being movable along the transverse axis in a first and second direction relative to said first fulcrum cam member, said seal member moves to said sealed position in response to the movement of said wedge along the transverse axis relative to said first fulcrum cam member in said first direction, said seal member moves to said open position in response to the movement of said wedge along the transverse axis relative to said first fulcrum cam member in said second direction, and said wedge rides on said first fulcrum cam member during movement of said wedge along the transverse axis in said first and second directions relative to said first fulcrum cam member.

2. The extrusion die of claim 1 wherein said first fulcrum cam member has a radiused surface on which said wedge rides.

3. An extrusion die having an internal flow passageway and an outlet orifice, said internal flow passageway leading to said outlet orifice, and an external deckle assembly comprising a deckle base, a seal member, a wedge, and a first fulcrum cam member, said seal member being moveable between an open position and a sealed position, wherein said seal member when in said sealed position is held forcibly against said outlet orifice and when in said open position is either spaced apart from said outlet orifice or held against said outlet orifice with less force than when in said sealed position, said wedge being movable in a first and second direction, said seal member moves to said sealed position in response to the movement of said wedge in said first direction, said seal member moves to said open position in response to the movement of said wedge in said second direction, and said wedge rides on said first fulcrum cam member during movement of said wedge in said first and second directions, said first fulcrum cam member comprises a sphere.

4. The extrusion die of claim 1 wherein said external deckle assembly also includes a second fulcrum cam member, and said wedge comprises an elongated wedge bar having a series of wedge surfaces that ride on said first and second fulcrum cam members during movement of said wedge along the transverse axis in said first and second directions relative to said first and second fulcrum cam members, each of said wedge surfaces being an angled ramp.

5. The extrusion die of claim 4 wherein said wedge bar has a plurality of transversely spaced apart grooves, each of said grooves having a first end and a second end, said second end of each groove being deeper than said first end so as to provide said angled ramp.

6. An extrusion die having an internal flow passageway and an outlet orifice, said internal flow passageway leading to said outlet orifice, and an external deckle assembly comprising a deckle base, a seal member, a wedge, and a first fulcrum cam member, said seal member being moveable between an open position and a sealed position, wherein said seal member when in said sealed position is held forcibly against said outlet orifice and when in said open position is either spaced apart from said outlet orifice or held against said outlet orifice with less force than when in said sealed position, said wedge being movable in a first and second direction, said seal member moves to said sealed position in response to the movement of said wedge in said first direction, said seal member moves to said open position in response to the movement of said wedge in said second direction, and said wedge rides on said first fulcrum cam member during movement of said wedge in said first and second directions, said external deckle assembly further comprising a second fulcrum cam member, said wedge comprising an elongated wedge bar having a series of wedge surfaces that ride on said first and second fulcrum cam members during movement of said wedge in said first and second directions, each of said wedge surfaces being an angled ramp, said wedge bar having a plurality of transversely spaced apart grooves, each of said grooves having a first end and a second end, said second end of each groove being deeper than said first end so as to provide said angled ramp, said first and second fulcrum cam members comprise spheres received in respective ones of said grooves.

7. The extrusion die of claim 1 wherein said external deckle assembly also has an actuator operably coupled with said wedge to move said wedge along the transverse axis in said first and second directions relative to said first fulcrum cam member.

8. The extrusion die of claim 7 wherein said actuator comprises a threaded adjustment member, and wherein rotation of said adjustment member in one direction causes said wedge to move along the transverse axis in said first direction relative to said first fulcrum cam member while rotation of said adjustment member in another direction causes said wedge to move along the transverse axis in said second direction relative to said first fulcrum cam member.

9. The extrusion die of claim 8 wherein said deckle base has a bottom wall, said external deckle assembly has a second fulcrum cam member, and said wedge comprises an elongated wedge bar having a series of wedge surfaces that ride on said first and second fulcrum cam members during movement of said wedge along the transverse axis in said first and second directions relative to said first and second fulcrum cam members, said seal member being an elongated seal bar that is attached removably to said elongated wedge bar, said elongated wedge bar being located between said elongated seal bar and said bottom wall of said deckle base, and wherein rotation of said threaded adjustment member causes said elongated wedge bar and said elongated seal bar to move together along the transverse axis in said first or second direction relative to said bottom wall of the deckle base.

10. The extrusion die of claim 9 wherein said deckle base has a channel in which said elongated wedge bar and said first and second fulcrum cam members are mounted removably.

11. The extrusion die of claim 1 wherein said external deckle assembly is a one-sided cantilevered external deckle.

12. The extrusion die of claim 1 wherein said extrusion die is constructed such that said wedge cams with and/or rolls over said first fulcrum cam member during movement of said wedge along the transverse axis in said first and second directions relative to said first fulcrum cam member.

13. The extrusion die of claim 5 wherein said first and second fulcrum cam members comprise spheres received in respective ones of said grooves, said extrusion die constructed such that each sphere rotates under and/or cams with said wedge during movement of said wedge along the transverse axis in said first and second directions relative to said spheres.

* * * * *